US009201142B2

(12) United States Patent  (10) Patent No.: US 9,201,142 B2
Antao  (45) Date of Patent: Dec. 1, 2015

(54) SONAR AND RADAR DISPLAY

(71) Applicant: Navico Holding AS, Egersund (NO)

(72) Inventor: Barry Antao, Owasso, OK (US)

(73) Assignee: Navico Holding AS, Egersund (NO)

( * ) Notice: Subject to any disclaimer, the term of this patent is extended or adjusted under 35 U.S.C. 154(b) by 358 days.

(21) Appl. No.: 13/827,571

(22) Filed: Mar. 14, 2013

(65) Prior Publication Data

US 2014/0269162 A1  Sep. 18, 2014

(51) Int. Cl.
*G01S 13/86* (2006.01)
*G01S 7/24* (2006.01)
*G01S 7/62* (2006.01)
*G01S 15/96* (2006.01)
*G01S 13/89* (2006.01)
*G01S 15/89* (2006.01)

(52) U.S. Cl.
CPC ........... *G01S 13/862* (2013.01); *G01S 7/24* (2013.01); *G01S 7/629* (2013.01); *G01S 13/89* (2013.01); *G01S 15/89* (2013.01); *G01S 15/96* (2013.01)

(58) Field of Classification Search
USPC ........................................................ 367/107
See application file for complete search history.

(56) References Cited

U.S. PATENT DOCUMENTS

| 5,293,351 | A | 3/1994 | Noponen |
| 5,420,828 | A * | 5/1995 | Geiger ........................... 367/131 |
| 6,181,644 | B1 | 1/2001 | Gallagher |
| 6,504,794 | B2 * | 1/2003 | Haase et al. .................. 367/119 |
| 6,868,360 | B1 * | 3/2005 | Olstad et al. .................. 702/150 |
| 7,190,636 | B1 * | 3/2007 | Depaola ........................ 367/131 |
| 7,371,218 | B2 * | 5/2008 | Walston et al. ............... 600/437 |
| 7,633,431 | B1 * | 12/2009 | Wey ....................... G01S 7/4026 342/165 |
| 8,195,084 | B2 * | 6/2012 | Xiao .................................. 434/4 |
| 8,896,480 | B1 * | 11/2014 | Wilson .................. G01S 13/953 342/176 |
| 2012/0299764 | A1 * | 11/2012 | Haneda ................... G01S 17/42 342/54 |

FOREIGN PATENT DOCUMENTS

| EP | 2 602 639 A1 | 6/2013 |
| GB | 2 421 312 A | 6/2006 |

OTHER PUBLICATIONS

Google Glass, [online] [retrieved Apr. 18, 2013] Retrieved from the Internet <URL: http://en.wikipedia.org/wiki/Google_Glass> pp. 1-9.

Navico set to GoFree, [online] [retrieved Apr. 18, 2013] Retrieved from the Internet <URL: http://www.marinebusiness.com.au/archive/navico-set-to-gofree>.

(Continued)

*Primary Examiner* — James Hulka
(74) *Attorney, Agent, or Firm* — Alston & Bird LLP

(57) ABSTRACT

Methods, apparatuses, and computer program products are herein provided for causing presentation of sonar or radar image data over environment information. A method may include determining a position and a line of sight of a device. The method may further include determining at least one of sonar image data or radar image data associated with the position and the line of sight. The method may further include causing presentation of an image associated with the at least one of sonar image data or radar image data on a display of the device over environment information indicative of an environment currently viewable by a user through the device. Corresponding apparatuses and computer program products are also provided.

28 Claims, 21 Drawing Sheets

(56) References Cited

OTHER PUBLICATIONS

International Search Report and Written Opinion for Application No. PCT/US2014/021133 dated Jun. 16, 2014.

Porathe, T., *3-D Nautical Charts and Safe Navigation Doctoral Dissertation and Safe Navigational Charts and Safe Navigation Department of Innovation, Design and Product Development*, Doctoral Dissertation No. 27, Mälardalen University (Jan. 1, 2006), 1-307 (XP055119720).

\* cited by examiner

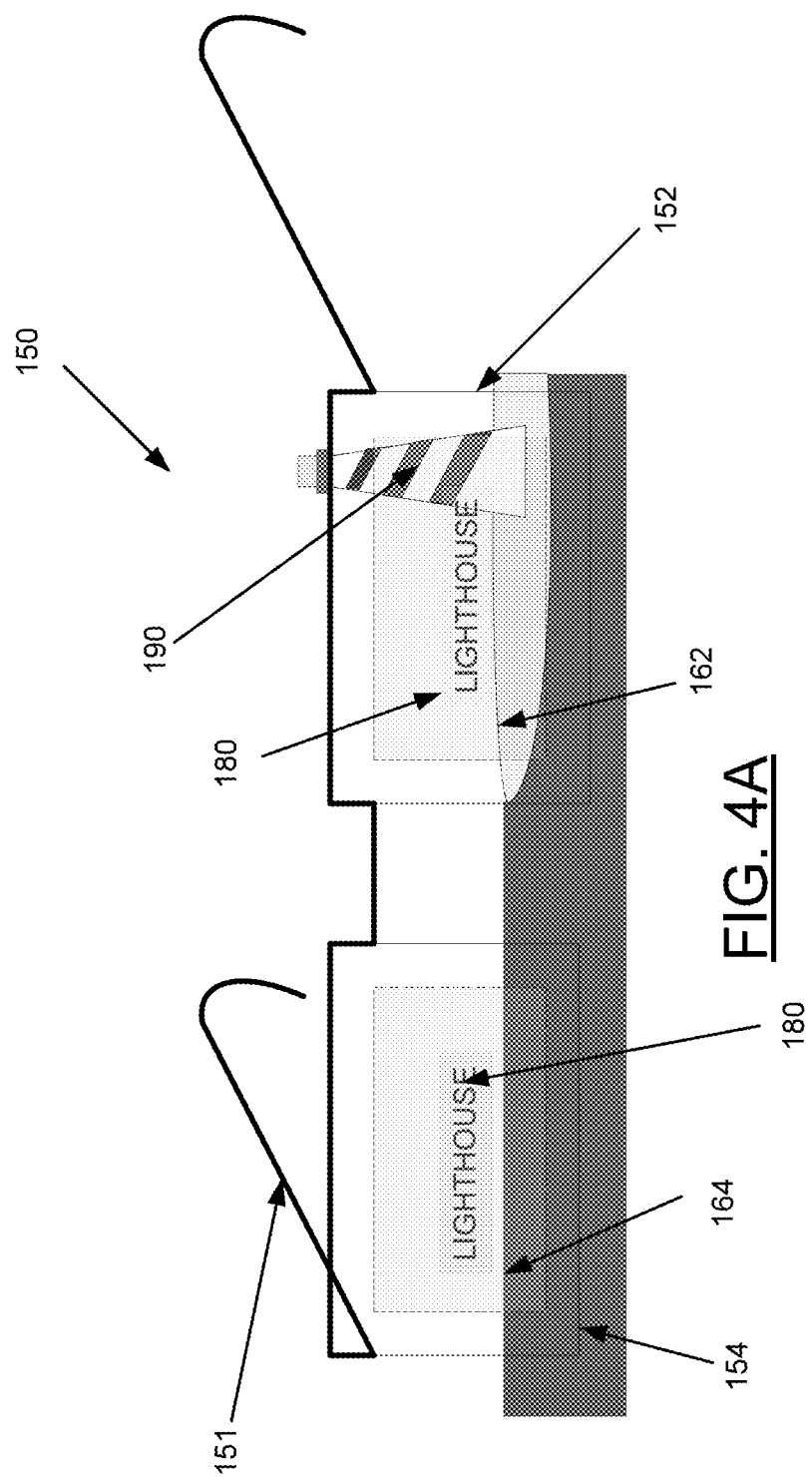

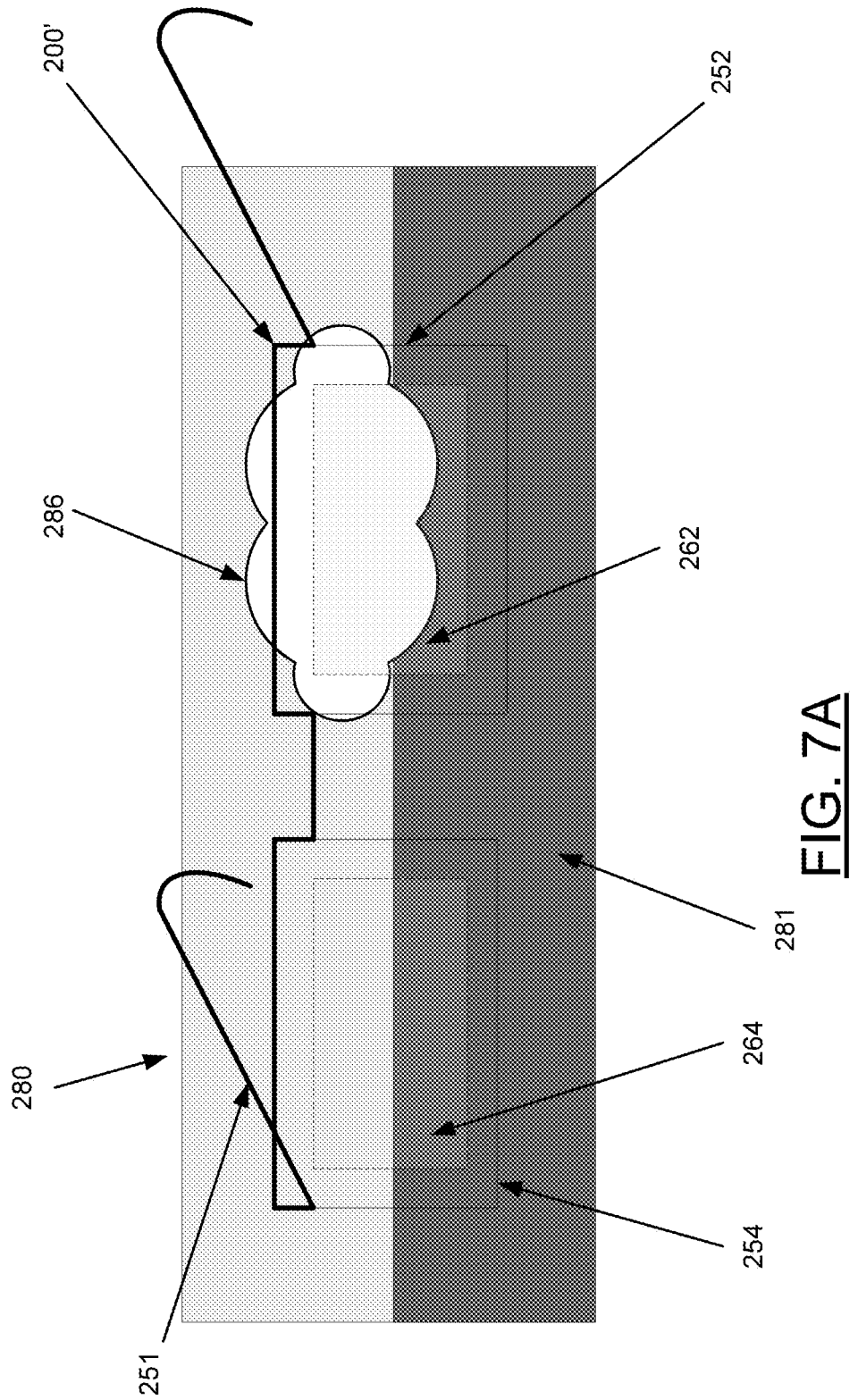

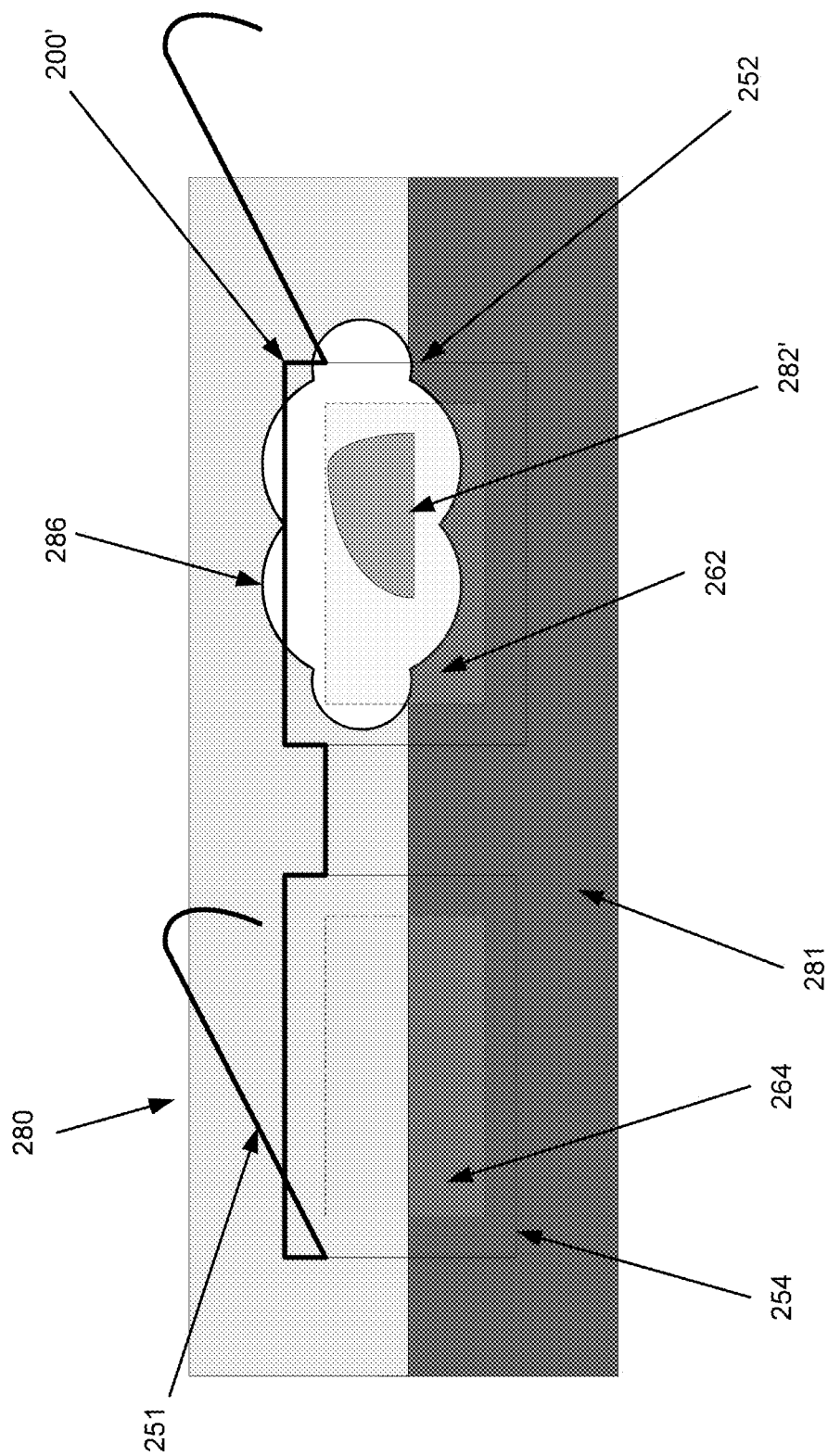

SONAR AND RADAR DISPLAY

FIELD OF THE INVENTION

Embodiments of the present invention relate generally to user interfaces for sonar systems and, more particularly, relate to methods, apparatuses, and computer program products for causing presentation of sonar or radar image data over environment information.

BACKGROUND OF THE INVENTION

Sonar (SOund Navigation And Ranging) has long been used to detect waterborne or underwater objects. For example, sonar devices may be used to determine depth and bottom topography, detect fish, locate wreckage, etc. In this regard, sonar transducer elements, or simply transducers, may convert electrical energy into sound or vibrations at a particular frequency. A sonar sound beam is transmitted into and through the water and is reflected from objects it encounters. The transducer may receive the reflected sound (the "sonar returns") and convert the sound energy into electrical energy. Based on the known speed of sound, it is possible to determine the distance to and/or location of the waterborne or underwater objects. The sonar return signals can also be processed to form a "picture" of the underwater environment. Likewise, radar systems may be used to determine the location of objects near the water craft. Further, the radar returns may also be processed to form an image of the discovered objects.

The image of the underwater environment from the sonar system may be presented on a display that is mounted to a water craft in order to be viewed by a user. Additionally, in some cases, radar images may be presented on the display.

BRIEF SUMMARY OF THE INVENTION

In some cases, however, the display may be mounted to the water craft. Thus, a user may be forced to look back and forth between the environment of interest (e.g., off the side of the water craft) and the display. It may be difficult for a user to correlate the images on the display with the environment of interest. Moreover, the user may be performing a task that may make it desirable for the user to not look away from the environment (e.g., the user may be fishing or driving the water craft, among other things).

As such, some embodiments of the present invention seek to provide for presentation of sonar and/or radar image data on a display over environment information. Indeed, as a user is looking at an environment, such as through display (e.g., a pass-through display), the sonar images and/or radar images may be presented over that environment information. For example, the user could be wearing a device with a head-mounted display that allows viewing of an environment (e.g., the water off the side of the boat) and the sonar image data for that spot in the water could be presented over the water to allow the user to see the underwater environment. In such a situation, a user may track fish swimming in the water or look for dangers in the water, such as large rocks. In fact, a user would not need to take their eyes off the water, but could still receive relevant sonar data. Similarly, radar image data could be presented on the display that enables a user to see relevant radar images while still viewing the environment.

Accordingly, embodiments of the present invention provide methods, apparatuses, and computer program products for improved sonar and radar display.

In an example embodiment, a method is provided. The method includes determining a position and a line of sight of a device. The method further includes determining at least one of sonar image data or radar image data associated with the position and the line of sight. The method further includes causing presentation of an image associated with the at least one of sonar image data or radar image data on a display of the device over environment information indicative of an environment currently viewable by a user through the device.

In some embodiments, the at least one sonar image data or radar image data associated with the position and the line of sight is indicative of sonar return data or radar return data currently being captured.

In some embodiments, the method further includes causing presentation of the image by causing presentation of the image over the environment information to be at least partially transparent. Additionally, the method may further include receiving user input indicating a desire to adjust a level of transparency of the image and, in response, causing adjustment of the level of transparency of the image based on the user input. Further, in some embodiments, the method may further include receiving user input by detecting movement of the user's head and causing adjustment of the level of transparency of the image by causing adjustment of the level of transparency based on a degree of movement of the user's head.

In some embodiments, the method further includes transmitting instructions to a sonar system to cause a sonar transducer to aim in a direction associated with the position and the line of sight of the device.

In some embodiments, the method further includes detecting movement of the device such that the device defines a second position and a second line of sight. The method further includes determining the second position and the second line of sight of the device. Additionally, the method includes determining at least one of second sonar image data or second radar image data associated with the second position and the second line of sight. The method further includes causing presentation of the image to be updated based on the at least one of second sonar image data or second radar image data.

In some embodiments, the method further includes receiving user input indicating a desire to cause presentation of the image associated with the at least one of sonar image data or radar image data associated with the position and line of sight.

In some embodiments, the method further includes receiving user input indicating a desire to cease presentation of the image and, in response, causing presentation of the image to cease.

In some embodiments, the method further includes determining the at least one of sonar image data or radar image data by transmitting the position and the line of sight to a sonar signal processor and receiving the at least one of sonar image data or radar image data associated with the position and the line of sight from the sonar signal processor.

In some embodiments, the method further includes determining the at least one of sonar image data or radar image data by receiving at least one of unfiltered sonar image data or unfiltered radar image data and determining the at least one of sonar image data or radar image data associated with the position and the line of sight from among the at least one of unfiltered sonar image data or unfiltered radar image data. The unfiltered sonar image data is indicative of sonar return data from at least one sonar transducer. The unfiltered radar image data is indicative of radar return data from a radar.

In some embodiments, the device comprises at least one lens. The user may view the environment through the at least one lens. The method may further include causing presentation of the image on the display by causing presentation of the image on at least a portion of the at least one lens.

In some embodiments, the method further includes causing presentation of the environment information on the display concurrent with causing presentation of the image on the display.

In some embodiments, the method may further include causing presentation of additional information on the display concurrent with causing presentation of the image on the display. The additional information includes at least one of navigational information, marine information, and weather information.

In another example embodiment, an apparatus comprising a processor and a memory including computer program code is provided. The memory and the computer program code being configured to, with the processor, cause the apparatus to determine a position and a line of sight of a device. The memory and computer program code being configured to, with the processor further cause the apparatus to determine at least one of sonar image data or radar image data associated with the position and the line of sight. The memory and computer program code being configured to, with the processor further cause the apparatus to cause presentation of an image associated with the at least one of sonar image data or radar image data on a display of the device over environment information indicative of an environment currently viewable by a user through the device.

In yet another example embodiment, a computer program product is provided. The computer program product comprises a non-transitory computer readable medium having program code portions stored thereon. The program code portions being a computer readable medium and configured when said program product is run on a computer or network device, to determine a position and a line of sight of a device. The program code portions being a computer readable medium and further configured when said program product is run on a computer or network device, to determine at least one of sonar image data or radar image data associated with the position and the line of sight. The program code portions being a computer readable medium and further configured when said program product is run on a computer or network device, to cause presentation of an image associated with the at least one of sonar image data or radar image data on a display of the device over environment information indicative of an environment currently viewable by a user through the device.

In yet another example embodiment, a sonar system for imaging an underwater environment is provided. The sonar system includes a sonar transducer assembly comprising at least one sonar transducer. The sonar transducer is configured to receive sonar returns from sonar pulses within the underwater environment and convert sound energy of the sonar returns into sonar return data. The sonar system further includes a sonar signal processor configured to receive and process the sonar return data to product sonar image data indicative of the underwater environment. The sonar system further includes a remote device. The remote device comprises a processor and a memory including computer program code, the memory and the computer program code configured to, with the processor, cause the device to determine a position and a line of sight of the device. The memory and the computer program code being further configured to, with the processor, cause the device to determine sonar image data associated with the position and the line of sight. The memory and the computer program code being further configured to, with the processor, cause the device to cause presentation of an image associated with the at least one of sonar image data or radar image data on a display of the device over environment information indicative of an environment currently viewable by a user through the device.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 4A illustrates an example device with a head-mounted display, such as may embody the apparatus shown in FIG. 3, wherein the display is pass-through such that a lighthouse can be seen through the display, in accordance with an example embodiment of the present invention;

FIG. 7A illustrates the example device shown in FIG. 4A, wherein the line of sight of device is directed toward fog and an obscured rock, in accordance with example embodiments described herein;

FIG. 7B illustrates the example device shown in FIG. 7A, wherein radar images from within the line of sight of device are being presented on the display over the fog, in accordance with example embodiments described herein;

Figure 10:
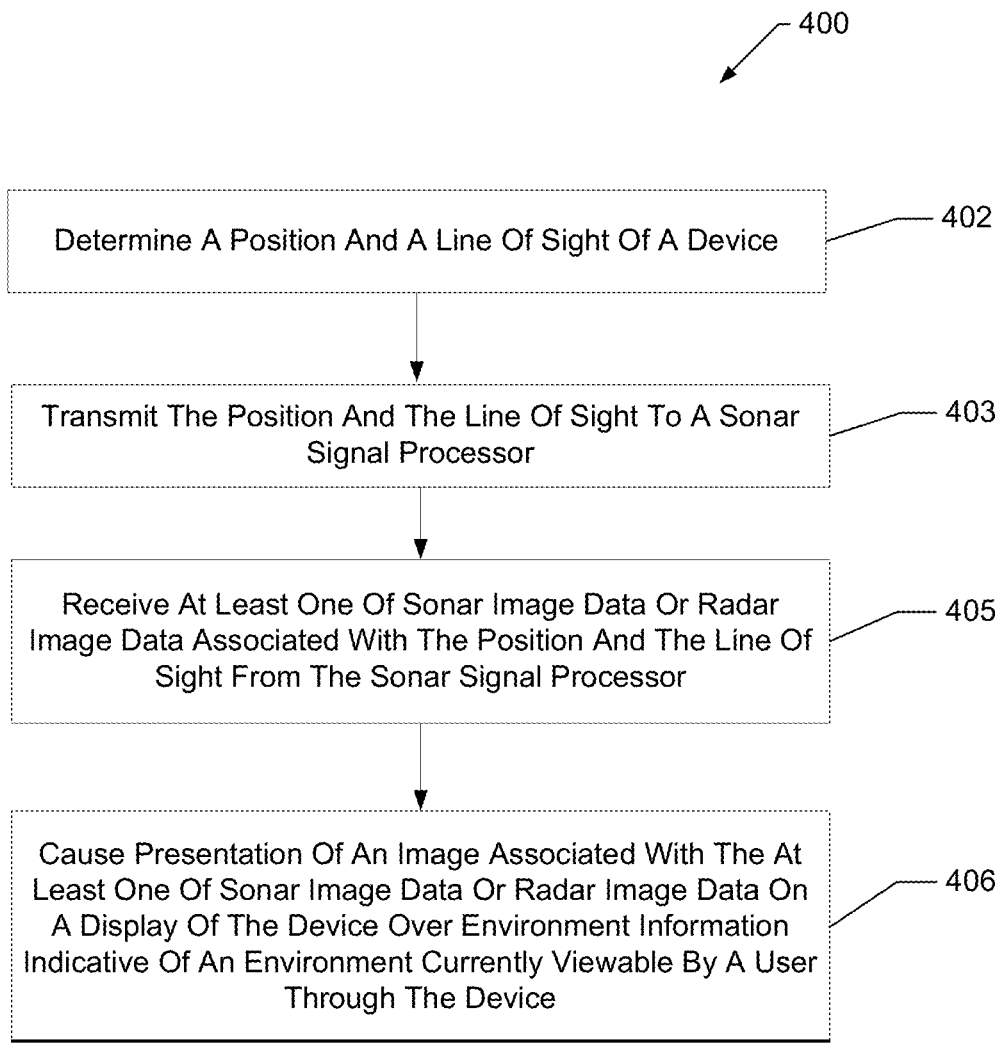
Figure 11:
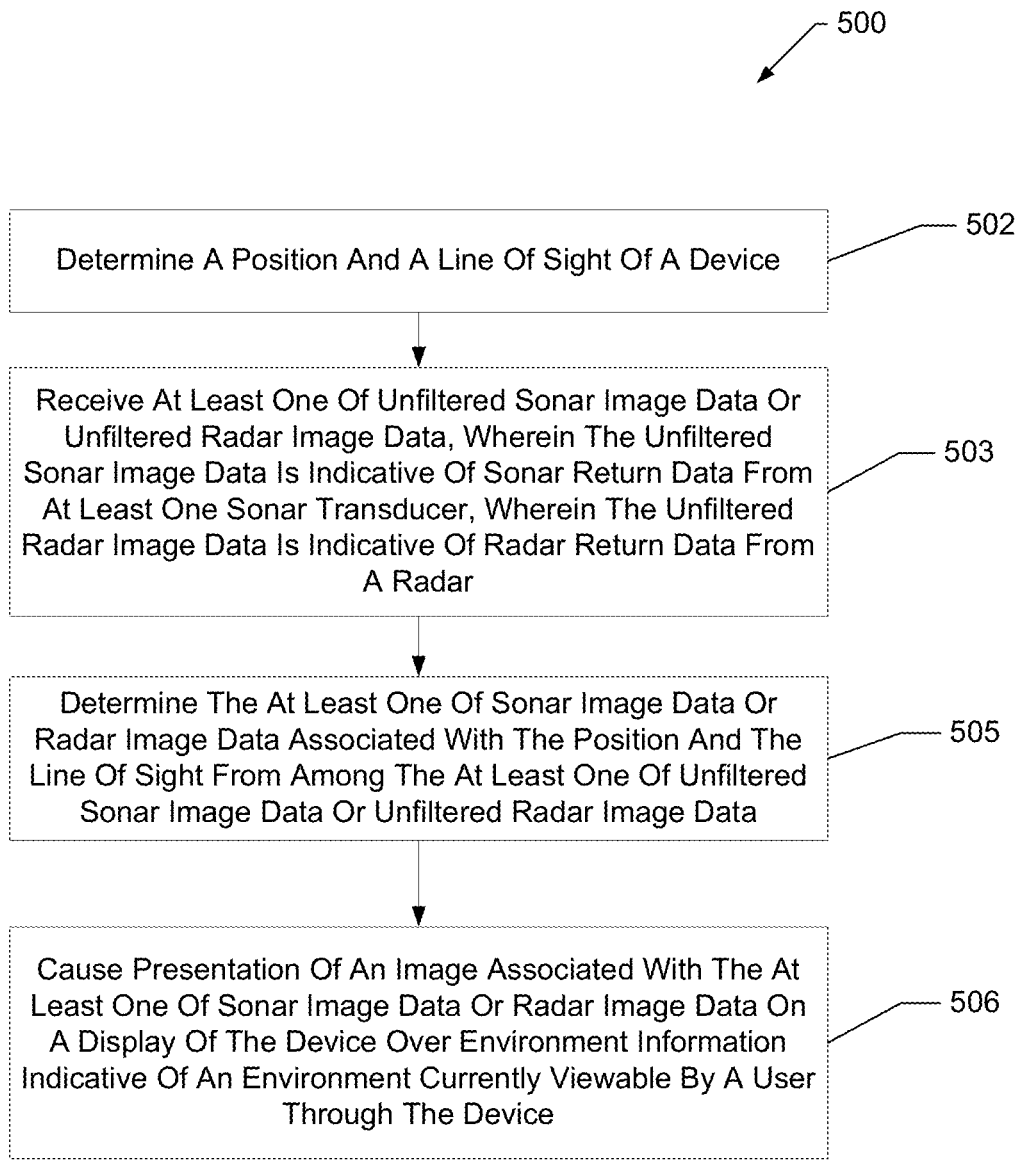

FIG. 10 illustrates a flowchart according to another example method for causing presentation of sonar or radar image data over environment information, in accordance with an example embodiment described herein; and FIG. 11 illustrates a flowchart according to yet another example method for causing presentation of sonar or radar image data over environment information, in accordance with an example embodiment described herein.

DETAILED DESCRIPTION OF THE INVENTION

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to singular or plural data capable of being transmitted, received, displayed and/or stored in accordance with various example embodiments. Thus, use of any such terms should not be taken to limit the spirit and scope of the disclosure.

The term "computer-readable medium" as used herein refers to any medium configured to participate in providing information to a processor, including instructions for execution. Such a medium may take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Figure 1:
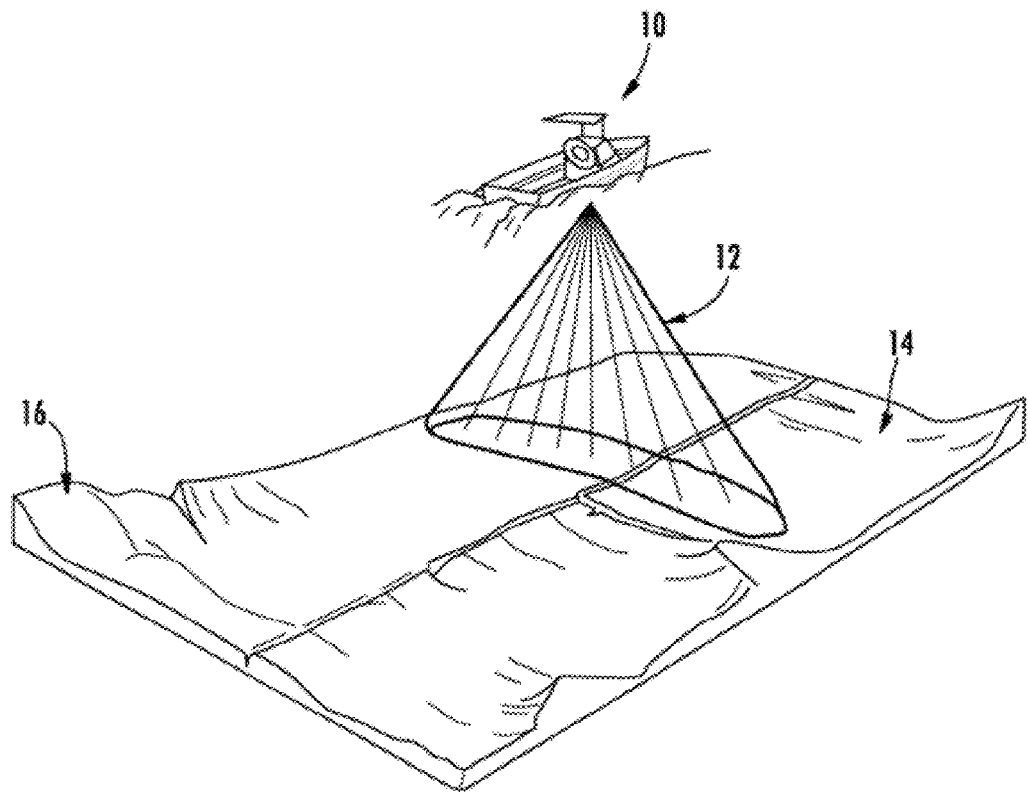
FIG. 1 is an illustration of an example sonar transducer emitting sonar pulses from a water craft.

Sonar systems, such as sonar depth finders, sidescan sonars, downscan sonars, and sonar fish finders, are commonly employed by boaters, sport fishermen, search and rescue personnel, researchers, surveyors, and others. With reference to FIG. 1, a water craft 10 may include a sonar system configured to create electrical pulses from a transceiver. A transducer then converts the electrical pulse into sound waves 12, which are sent into the water. In the depicted embodiment, a fan-shaped sound beam (e.g., a beam shape created from one or more rectangular transducers) is being transmitted into the water, however, as will be apparent to one of ordinary skill in the art in view of this disclosure, other sound beam configurations (e.g., conical shaped, elliptical shaped, multiple conical shaped, etc.) may be transmitted.

When the sound waves 12 strike anything of differing acoustic impedance (e.g., the sea floor or something suspended in the water above the bottom), the sound waves 12 reflect off that object. These echos or sonar returns may strike the transducer (or, in some cases, a separate receiver element), which converts the echos back into an electrical signal which is processed by a processor (e.g., sonar signal processor 32 shown in FIG. 2) and sent to a display (e.g., an LCD) mounted in the cabin or other convenient location in the water craft. This process is often called "sounding". Since the speed of sound in water is constant (approximately 4800 feet per second in fresh water), the time lapse between the transmitted signal and the received echos can be measured and the distance to the objects determined. This process repeats itself many times per second. The results of many soundings are used to build a picture on the display of the underwater world.

For example, the sound waves 12 may bounce off the floor 14 of the body of water and reflect back to the water craft, thereby indicating a depth of the water at that location. Sometimes, the floor 14 may have an uneven topography (e.g., a raised surface 16) that may reflect different depths of the water at different locations. In such a circumstance, the sound waves 12 reflect off the various floor surfaces and back to the water craft 10. If the raised surface 16 is closer to the water craft 10, the sound waves 12 will reach the water craft 10 earlier and the sonar system will calculate that the depth is shallower at raised surface 16 than at surface 14. Additionally, objects on the floor (e.g., sunken logs, rocks, wreckage of ships, etc.) reflect the sonar beams and are detected as topographical features. Fish in the water also create their own characteristic sonar returns.

Though the depicted embodiment of FIG. 1 details a sonar system that produces a fan-shaped beam defined by the sound waves 12, embodiments of the present invention contemplate use of any type of transducer element to produce any shaped beam for projecting sonar pulses and/or receiving sonar returns. Said differently, some embodiments of the present invention may be used with any type of transducer assembly. For example, in some embodiments, the sonar system may provide a transducer assembly that is steerable (e.g., rotatable). Along these lines, as is consistent with disclosure herein, the transducer assembly may be steered (e.g., with respect to the water craft) to capture sonar returns from different volumes of the underwater environment.

Figure 2:
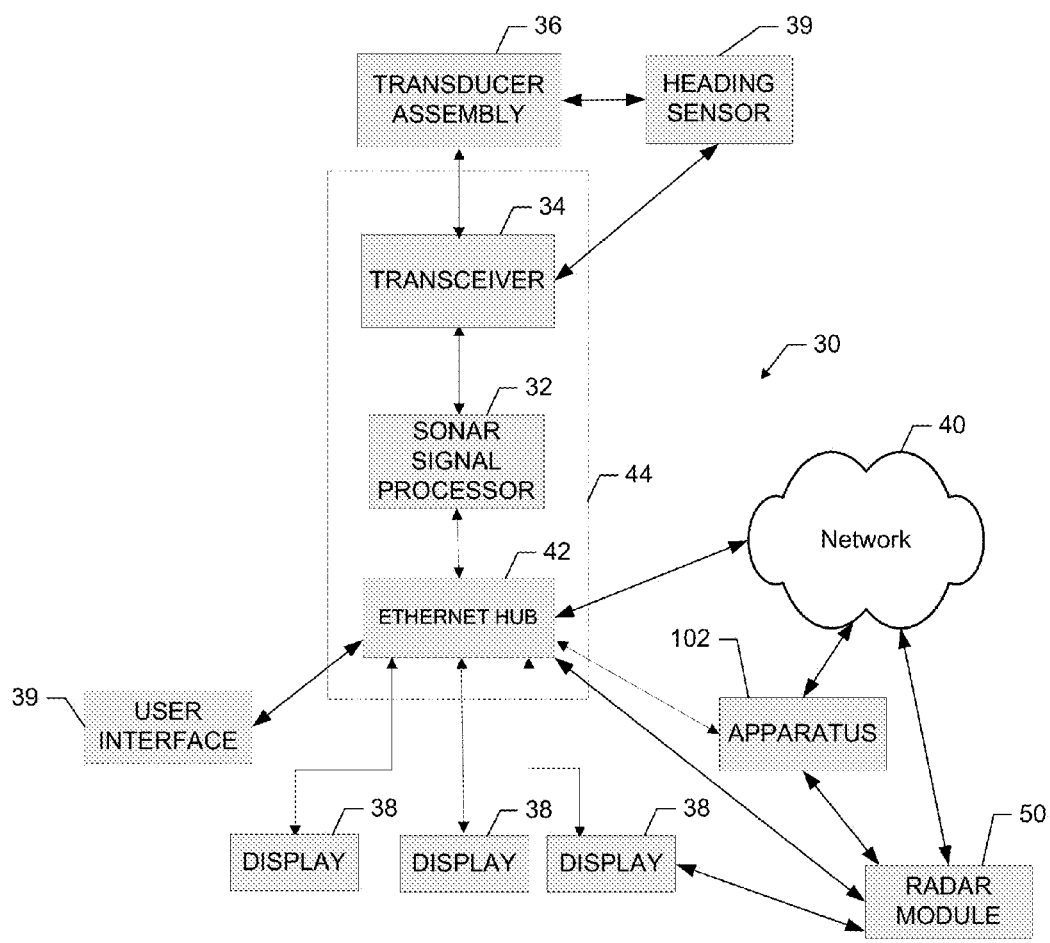
FIG. 2 is a basic block diagram illustrating a sonar system, in accordance with example embodiments described herein.

FIG. 2 is a basic block diagram illustrating a sonar system 30 capable for use with multiple example embodiments of the present invention. As shown, the sonar system 30 may include a number of different modules or components, each of which may comprise any device or means embodied in either hardware, software, or a combination of hardware and software configured to perform one or more corresponding functions. For example, the sonar system 30 may include a sonar signal processor 32, a transceiver 34 and a transducer assembly 36 and/or numerous other peripheral devices such as one or more multi-function displays 38. One or more of the modules may be configured to communicate with one or more of the other modules to process and/or display data, information or the like from one or more of the modules. The modules may also be configured to communicate with one another in any of a number of different manners including, for example, via a network 40. In this regard, the network 40 may be any of a number of different communication backbones or frameworks including, for example, Ethernet, the NMEA 2000 framework or other suitable networks. The network may also support other data sources, including GPS, autopilot, engine data, compass, radar, etc.

The display 38 may be configured to display images and may include or otherwise be in communication with a user interface 39 configured to receive an input from a user. The display 38 may be, for example, a conventional LCD (liquid crystal display), a touch screen display, or any other suitable display known in the art upon which images may be rendered. Although each display 38 of FIG. 2 is shown as being connected to the sonar signal processor 32 via the network and/or via an Ethernet hub, the display 38 could alternatively be in direct communication with the sonar signal processor 32 in some embodiments, or the display 38, sonar signal processor 32 and user interface 39 could be in a single housing. The user interface 39 may include, for example, a keyboard, keypad, function keys, mouse, scrolling device, input/output ports, touch screen, or any other mechanism by which a user may interface with the system. Moreover, in some cases, the user interface 39 may be a portion of one or more of the displays 38.

In an example embodiment, the sonar signal processor 32, the transceiver 34 and an Ethernet hub 42 or other network hub may form a sonar module 44. As such, for example, in some cases, the transducer assembly 36 may simply be placed into communication with the sonar module 44, which may itself be a mobile device that may be placed (but not necessarily mounted in a fixed arrangement) in the vessel to permit easy installation of one or more displays 38, each of which may be remotely located from each other and operable independent of each other. In this regard, for example, the Ethernet hub 42 may include one or more corresponding interface ports for placing the network 40 in communication with each display 38 in a plug-n-play manner. As such, for example, the Ethernet hub 42 may not only include the hardware needed to enable the displays 38 to be plugged into communication with the network 40 via the Ethernet hub 42, but the Ethernet hub 42 may also include or otherwise be in communication with software modules for providing information to enable the sonar module 44 to communicate with one or more different instances of the display 38 that may or may not be the same model or type of display and that may display the same or different information. In other words, the sonar module 44 may store configuration settings defining a predefined set of display types with which the sonar module is compatible so that if any of the predefined set of display types are placed into communication with the sonar module 44, the sonar module 44 may operate in a plug-n-play manner with the corresponding display types. Accordingly, the sonar module 44 may include a memory storing device driver accessible to the Ethernet hub 42 to enable the Ethernet hub 42 to properly work with displays for which the sonar module 44 is compatible. The sonar module 44 may also be enabled to be upgraded with additional device drivers or transceivers to enable expansion of the numbers and types of devices with which the sonar module 44 may be compatible. In some cases, the user may select a display type to check whether a display type is supported and, if the display type is not supported, contact a network entity to request software and/or drivers for enabling support of the corresponding display type.

The sonar signal processor 32 may be any means such as a device or circuitry operating in accordance with software or otherwise embodied in hardware or a combination of hardware and software (e.g., a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the sonar signal processor 32 as described herein. In this regard, the sonar signal processor 32 may be configured to analyze electrical signals communicated thereto by the transceiver 34 to provide sonar data indicative of the size, location, shape, etc. of objects detected by the sonar system 30. For example, the sonar signal processor 32 may be configured to receive sonar return data and process the sonar return data to generate sonar image data for display to a user (e.g., on display 38).

In some cases, the sonar signal processor 32 may include a processor, a processing element, a coprocessor, a controller or various other processing means or devices including integrated circuits such as, for example, an ASIC, FPGA or hardware accelerator, that is configured to execute various programmed operations or instructions stored in a memory device. The sonar signal processor 32 may further or alternatively embody multiple compatible additional hardware or hardware and software items to implement signal processing or enhancement features to improve the display characteristics or data or images, collect or process additional data, such as time, temperature, GPS information, waypoint designations, or others, or may filter extraneous data to better analyze the collected data. It may further implement notices and alarms, such as those determined or adjusted by a user, to reflect depth, presence of fish, proximity of other watercraft, etc. Still further, the processor, in combination with suitable memory, may store incoming transducer data or screen images for future playback or transfer, or alter images with additional processing to implement zoom or lateral movement, or to correlate data, such as fish or bottom features to a GPS position or temperature. In an exemplary embodiment, the sonar signal processor 32 may execute commercially available software for controlling the transceiver 34 and/or transducer assembly 36 and for processing data received therefrom.

The transceiver 34 may be any means such as a device or circuitry operating in accordance with software or otherwise embodied in hardware or a combination of hardware and software (e.g., a processor operating under software control or the processor embodied as an ASIC or FPGA specifically configured to perform the operations described herein, or a combination thereof) thereby configuring the device or circuitry to perform the corresponding functions of the transceiver 34 as described herein. In this regard, for example, the transceiver 34 may include (or be in communication with) circuitry (for providing one or more transmission electrical signals to the transducer assembly 36 for conversion to sound pressure signals based on the provided electrical signals to be transmitted as a sonar pulse. The transceiver 34 may also include (or be in communication with) circuitry for receiving one or more electrical signals produced by the transducer assembly 36 responsive to sound pressure signals received at the transducer assembly 36 based on echo or other return signals received in response to the transmission of a sonar pulse. The transceiver 34 may be in communication with the sonar signal processor 32 to both receive instructions regarding the transmission of sonar signals and to provide information on sonar returns to the sonar signal processor 32 for analysis and ultimately for driving one or more of the displays 38 based on the sonar returns.

The transducer assembly 36 according to an exemplary embodiment may be provided in one or more housings that provide for flexible mounting with respect to a hull of the water craft or trolling motor on which the sonar system 30 is employed. In this regard, for example, the housing may be mounted onto the hull of the water craft or onto a device or component that may be attached to the water craft (e.g., a trolling motor or other steerable device, or another component that is mountable relative to the hull of the water craft), including a bracket that is adjustable on multiple axes, permitting rotation of the housing and/or the transducer elements contained therein.

The transducer assembly 36 may include one or more transducer elements positioned within the housing. In some embodiments, each of the transducer elements may be positioned within the housing so as to point toward a different volume under or to the side of the water craft. The transducer elements can convert electrical energy into sound energy (i.e., transmit) and also convert sound energy (e.g., via detected pressure changes) into an electrical signal (i.e., receive), although some transducers may act only as a hydrophone for converting sound energy into an electrical signal without operating as a transmitter, or only operating to convert an electrical signal into sound energy without operating as a receiver. Depending on the desired operation of the transducer assembly, each of the transducer elements may be configured to transmit sonar pulses and/or receive sonar returns as desired.

In some embodiments, the transducer assembly 36 may comprise (or be in communication with) a heading sensor 69. In some embodiments, the heading sensor 69 may be configured to detect the heading of the at least one transducer element. Additionally, the heading sensor 69 may be in communication with the transceiver/processor and may provide the detected heading to the transceiver 34 and/or processor 32. In such an embodiment, the heading of the transducer element may be controlled and/or known, such as for steering purposes.

In some embodiments, each transducer element may comprise any shape. The shape of a transducer element largely determines the type of beam that is formed when that transducer element transmits a sonar pulse (e.g., a circular transducer element emits a cone-shaped beam, a linear transducer emits a fan-shaped beam, etc.). In some embodiments, a transducer element may comprise one or more transducer elements positioned to form one transducer element. For example, a linear transducer element may comprise two or more rectangular transducer elements aligned with each other so as to be collinear. In some embodiments, three transducer elements aligned in a collinear fashion (e.g., end to end) may define one linear transducer element.

Likewise, transducer elements may comprise different types of materials that cause different sonar pulse properties upon transmission. For example, the type of material may determine the strength of the sonar pulse. Additionally, the type of material may affect the sonar returns received by the transducer element. As such, embodiments of the present invention are not meant to limit the shape or material of the transducer elements. Indeed, while depicted and described embodiments generally detail a square or linear transducer element made of piezoelectric material, other shapes and types of material are applicable to embodiments of the present invention.

In some embodiments, each transducer element may be configured to operate at any frequency, including operation over an array of frequencies. Along these lines, it should be understood that many different operating ranges could be provided with corresponding different transducer element sizes and shapes (and corresponding different beamwidth characteristics). Moreover, in some cases, the sonar module 44 may include a variable frequency selector, to enable an operator to select a particular frequency of choice for the current operating conditions.

In some embodiments, the sonar module 44 may be in communication with a radar module 50. In some embodiments, the sonar module 44 may be in direct communication with the radar module 50 or indirect, such as through the network 40. The radar module 50 may be configured to collect radar data and may include a processor configured to process the radar data into radar image data. Alternatively, in some embodiments, the radar module 50 may be configured to provide the radar data to a processor of the sonar module 44 or an apparatus 102 for processing. Further, in some embodiments, the radar image data may be presented on a display, such as display 38 or a display of the apparatus 102.

In some embodiments, the sonar module 44 and/or radar module 50 may be in communication with an apparatus 102. In some embodiments, the sonar module 44 and/or radar module 50 may be in direct communication with the apparatus 102 or indirect, such as through the network 40. In some embodiments, the apparatus 102 may be remotely located from the sonar module 44 and/or radar module 50.

Figure 3:
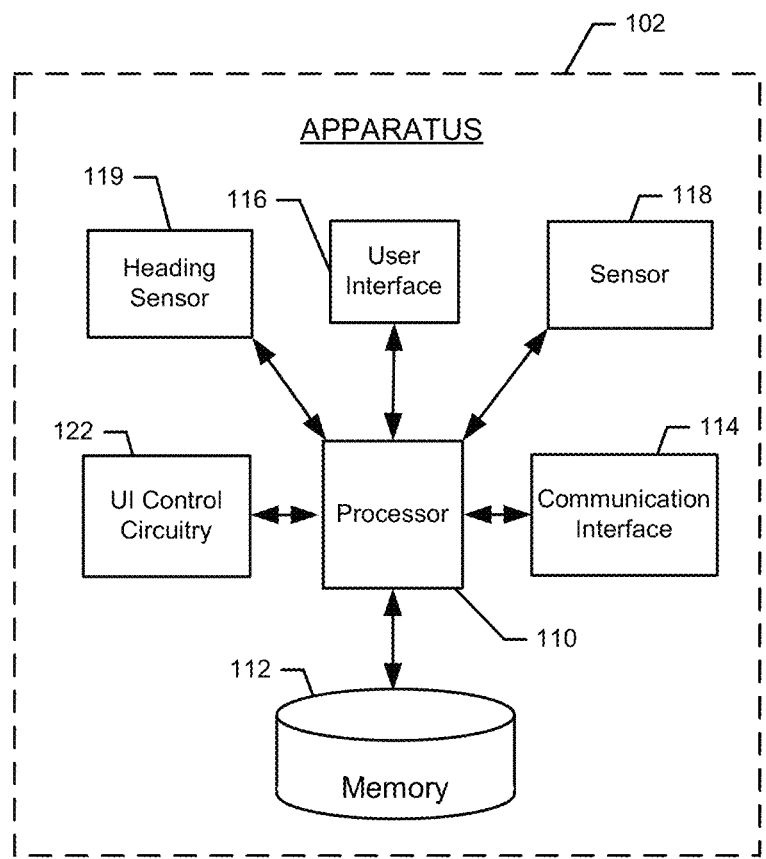
FIG. 3 illustrates a block diagram of an apparatus with a user interface, in accordance with example embodiments described herein.

FIG. 3 illustrates a block diagram of the apparatus 102 for causing presentation of sonar or radar data over environment information. It will be appreciated that the apparatus 102 is provided as an example of one embodiment and should not be construed to narrow the scope or spirit of the invention in any way. In this regard, the scope of the disclosure encompasses many potential embodiments in addition to those illustrated and described herein. As such, while FIG. 3 illustrates one example of a configuration of an apparatus for facilitating interaction with a user interface, other configurations may also be used to implement embodiments of the present invention.

The apparatus 102 may be embodied as any type of device with a display. For example, in some embodiments, the apparatus 102 may be a device with a pass-through display (e.g., a head-mounted display). Additionally or alternatively, the apparatus 102 may be a device with a non-pass-through display, but which, as described in greater detail herein, may be configured to show a representation of the viewing environment and, therefore, act as a pass-through display. Along these lines, the apparatus 102, in some embodiments, may be either a fixed device or a mobile device such as a desktop computer, laptop computer, mobile terminal, mobile computer, mobile phone, mobile communication device, game device, digital camera/camcorder, audio/video player, television device, radio receiver, digital video recorder, positioning device, a chipset, a computing device comprising a chipset, any combination thereof, and/or the like. In this regard, the apparatus 102 may comprise any computing device that includes or is in operative communication with a display.

The apparatus 102 includes various means for performing the various functions herein described. These means may comprise one or more of a processor 110, memory 112, communication interface 114, user interface 116, sensor 118, heading sensor 119, or user interface (UI) control circuitry 122. The means of the apparatus 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 112) that is executable by a suitably configured processing device (e.g., the processor 110), or some combination thereof.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC or FPGA, one or more other types of hardware processors, or some combination thereof. Accordingly, although illustrated in FIG. 3 as a single processor, in some embodiments the processor 110 comprises a plurality of processors. The plurality of processors may be in operative communication with each other and may be collectively configured to perform one or more functionalities of the apparatus 102 as described herein. In some example embodiments, the processor 110 is configured to execute instructions stored in the memory 112 or otherwise accessible to the processor 110. These instructions, when executed by the processor 110, may cause the apparatus 102 to perform one or more of the functionalities of the apparatus 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. In this regard, the memory 112 may comprise a non-transitory computer-readable storage medium. Although illustrated in FIG. 3 as a single memory, the memory 112 may comprise a plurality of memories. The plurality of memories may be embodied on a single computing device or may be distributed across a plurality of computing devices collectively configured to function as the apparatus 102. In various example embodiments, the memory 112 may comprise a hard disk, random access memory, cache memory, flash memory, a compact disc read only memory (CD-ROM), digital versatile disc read only memory (DVD-ROM), an optical disc, circuitry configured to store information, or some combination thereof. The memory 112 may be configured to store information, data, applications, instructions, or the like for enabling the apparatus 102 to carry out various functions in accordance with various example embodiments. For example, in some example embodiments, the memory 112 is configured to buffer input data for processing by the processor 110. Additionally or alternatively, the memory 112 may be configured to store program instructions for execution by the processor 110. The memory 112 may store information in the form of static and/or dynamic information. The stored information may include, for example, images, content, media content, user data, application data, and/or the like. This stored information may be stored and/or used by the UI control circuitry 122 during the course of performing its functionalities.

The communication interface 114 may be embodied as any device or means embodied in circuitry, hardware, a computer program product comprising computer readable program instructions stored on a computer readable medium (e.g., the memory 112) and executed by a processing device (e.g., the processor 110), or a combination thereof that is configured to receive and/or transmit data from/to another computing device. In some example embodiments, the communication interface 114 is at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more remote computing devices. The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like by which the apparatus 102 and one or more computing devices may be in communication. The communication interface 114 may additionally be in communication with the memory 112, user interface 116, sensor 118, and/or UI control circuitry 122, such as via a bus.

The sensor 118 may be in communication with the processor 110, user interface 116, and/or UI control circuitry 122. In some embodiments, the sensor 118 may be configured to detect or sense user input. Additionally or alternatively, the sensor 118 may be configured to detect or sense movement of the apparatus 102. In some embodiments, the sensor 118 is configured to sense the degree of movement of the apparatus 102. In some embodiments, the sensor 118 may provide output (e.g., signals, beams, pictures, videos, etc.) to the processor 110 to enable the processor 110 to determine the degree of movement of the device. In some embodiments, the sensor 118 may be configured to detect or sense the position and/or location of the apparatus 102. Additionally or alternatively, in some embodiments, the sensor 118 may be configured to detect or sense the orientation of the apparatus 102. In such embodiments, the sensor 118 may provide output (e.g., signals, beams, pictures, videos, etc.) to the processor 110 to enable the processor 110 to determine the position and/or line of sight of the apparatus 102. Along these lines, in some embodiments, the sensor 118 may include any type of sensor (or a combination of sensors), such as proximity sensor, light sensor, gyroscope, camera, and/or accelerometer.

The heading sensor 119 may be in communication with the processor 110 and/or user interface 116. In some embodiments, the heading sensor 119 may be configured to detect or sense the heading of the apparatus 102. In such embodiments, the sensor 118 may provide output (e.g., signals, beams, pictures, videos, etc.) to the processor 110 to enable the processor 110 to determine the line of sight of the apparatus 102.

The UI control circuitry 122 may be embodied as various means, such as circuitry, hardware, a computer program product comprising computer readable program instructions stored on a computer readable medium (e.g., the memory 112) and executed by a processing device (e.g., the processor 110), or some combination thereof and, in some embodiments, is embodied as or otherwise controlled by the processor 110. In some example embodiments wherein the UI control circuitry 122 is embodied separately from the processor 110, the UI control circuitry 122 may be in communication with the processor 110. The UI control circuitry 122 may further be in communication with one or more of the memory 112, communication interface 114, sensor 118, and/or user interface 116, such as via a bus.

The UI control circuitry 122 may be configured to receive user input from a user interface 116, such as a touch display. The user input or signal may carry positional information indicative of the user input. In this regard, the position may comprise a position of the user input in a two-dimensional space, which may be relative to the surface of the touch display user interface. For example, the position may comprise a coordinate position relative to a two-dimensional coordinate system (e.g., an X and Y axis), such that the position may be determined. Accordingly, the UI control circuitry 122 may determine a position of the user input such as for determining a portion of the display to which the user input correlates.

The touch display may also be configured to enable the detection of a hovering gesture input. A hovering gesture input may comprise a gesture input to the touch display without making physical contact with a surface of the touch display, such as a gesture made in a space some distance above/in front of the surface of the touch display. As an example, the touch display may comprise a projected capacitive touch display, which may be configured to enable detection of capacitance of a finger or other input object by which a gesture may be made without physically contacting a display surface. As another example, the touch display may be configured to enable detection of a hovering gesture input through use of acoustic wave touch sensor technology, electromagnetic touch sensing technology, near field imaging technology, optical sensing technology, infrared proximity sensing technology, some combination thereof, or the like.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/output mechanisms. In some embodiments, a display may refer to display on a screen, on a wall, on glasses (e.g., near-eye-display), in the air, etc. The user interface 116 may be in communication with the memory 112, communication interface 114, sensor 118, and/or UI control circuitry 122, such as via a bus.

In some embodiments, the user interface 116 may comprise a pass-through display. In some embodiments, a pass-through display may be configured to present images (e.g., text, icons, pictures, videos, visual attractants, etc.) in an at least partially transparent form (e.g., image overlay) such that a user may be able to see through the images being presented. Though some example embodiments are described herein with respect to a pass-through display, other user interfaces are contemplated (e.g., presentation screen, projection display, among others).

As such, some example embodiments may provide for an apparatus (e.g., apparatus 102) for providing input through a device comprising a display, such as the glasses 150 shown in FIG. 4A. The apparatus with a pass-through display may provide a visual overlay of images on a substantially transparent display surface, such as through lenses that appear to be normal optical glass lenses. This visual overlay allows a user to view objects and people in their typical, un-obscured field of view while providing additional images that may be displayed on the pass-through display. The visual overlay of the images may be of various opacity ranging from transparent (or 0% opacity) to opaque (or 100% opacity). For example, the images presented on the pass-through display may, in some cases, fully occlude the user's vision beyond the display by being presented in a substantially opaque manner on a substantially transparent display. In some embodiments, the presented images may be partially transparent such that the wearer is able to see the environment beyond the pass-through display. The degree of transparency may be variable from fully transparent, where the image is not shown, to fully opaque or non-transparent, or any degree therebetween. Additionally, in some embodiments, the degree of transparency may vary across the entire display.

Example embodiments may also present information that is arranged at the edges of the pass-through display or that include a central area of the display which is substantially transparent while presenting a less transparent and possibly opaque image around the substantially transparent area. Such an embodiment may allow a user to view their environment while also providing images for the user to view.

An example of a device (e.g., such as may embody apparatus 102) with a pass-through display is illustrated in FIG. 4A. FIG. 4A illustrates an example head-mounted display (e.g., glasses 150) that includes a left lens 154 and a right lens 152. The left lens 154 and right lens 152 may be configured to interact with a user's left and right eye respectively. Additionally, the glasses 150 may include a frame 151 that is configured to engage with a user's head (e.g., ears) to mount to the user's head.

In some embodiments, the glasses 150 may comprise (or be in communication with) a processor (e.g., processor 110) that is configured to control presentation of images. For example, in the depicted embodiment of the glasses 150, the processor may be configured to control presentation of images on a left lens display 164 and a right lens display 162. In some embodiments, the images presented on the left lens display 164 and right lens display 162 may be independent and/or they may be complementary.

As illustrated in FIG. 4A, a user (not shown) may look through the left lens 154 and right lens 152 and the corresponding left lens display 164 and right lens displays 162, respectively, to see information, such as a lighthouse 190. Additionally, in some embodiments, the glasses 150 may be configured to cause presentation of images on the left lens display 164 and/or right lens display 162. In the depicted embodiment, the description "LIGHTHOUSE" 180 is being presented to the user on the left lens display 164 and right lens displays 162 to indicate that the user is looking at the lighthouse (e.g., through the left lens 154 and right lens 152). Though words are shown as being presented on the display, embodiments of the present invention contemplate presenting other types of images on the display (e.g., pictures, videos, notifications, visual attractants, etc.). Additionally, though the words shown in FIG. 4A are not transparent, embodiments of the present invention contemplate presentation of at least partially transparent images on the display.

Figure 4B:
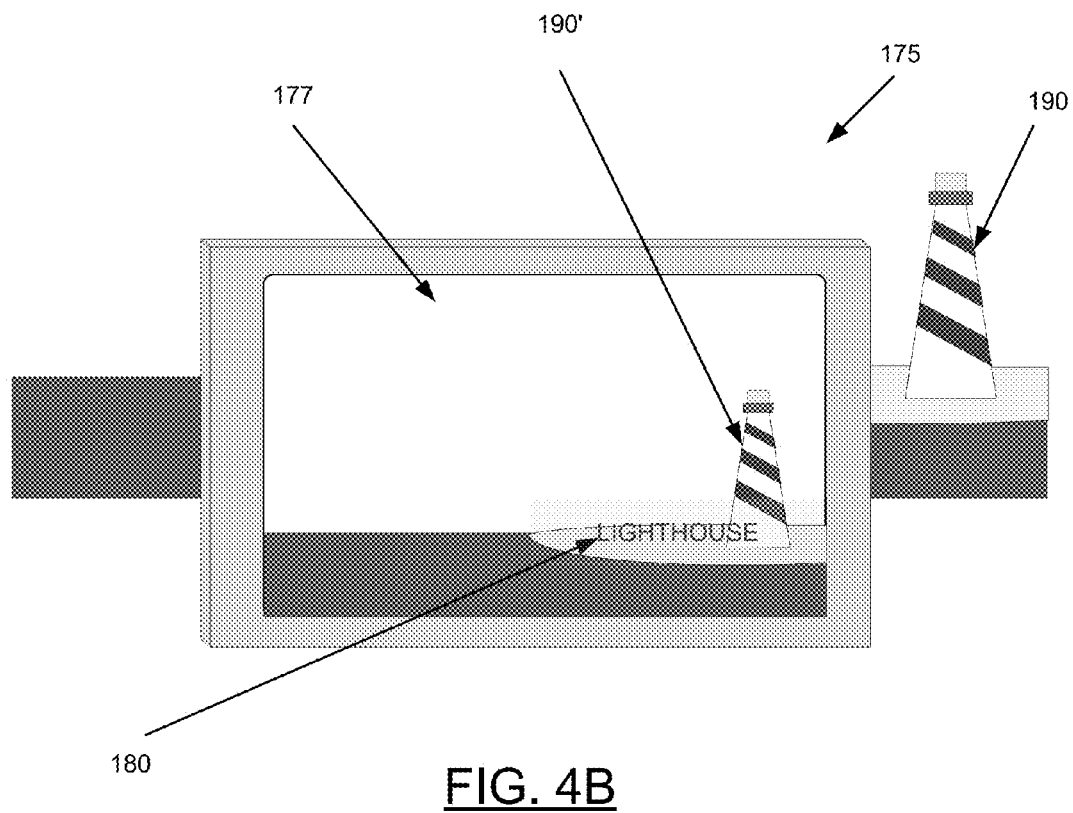
FIG. 4B illustrates an example device with a display, such as may embody the apparatus shown in FIG. 3, wherein the display is presenting information indicative of an environment with a lighthouse being currently viewed by the apparatus, in accordance with an example embodiment of the present invention.

It should also be noted that while FIG. 4A illustrates one example of an apparatus with a pass-through display, numerous other apparatuses configured with a pass-through display are contemplated for embodiments of the present invention (e.g., a helmet visor, a cockpit windshield, etc.). Moreover, embodiments of the present invention are not meant to be limited to apparatuses with pass-through displays, and may be useful with other example apparatuses, such as any apparatus 102 described herein. Along these lines, as noted above, some embodiments of the present invention contemplate a device with a display that acts like a pass-through display in that a representation of the environment currently being viewed is also presented on the display. For example, with reference to FIG. 4B, an example device 175 includes a display 177. The device 175 may be aimed at a scene that includes the lighthouse 190. Through use of some features of the device 175, such as a camera (not shown), information representative of the scene with the lighthouse 190 (e.g., environment information) may be presented on the display 177. For example, information 190' representative of the lighthouse 190 is presented on the display 177. Such an image may be updated in real-time such that changes in the scene (e.g., waves crashing on the shore) may be automatically updated on the display 177.

As used herein, the term "environment information" may be referred to as information indicative of the environment currently viewable by a user through the device. As such, in some embodiments, the term "environment information" may refer to the environment that can be seen through the lens of the device (e.g., the left lens 154 and the right lens 152 of the glasses 150). Additionally, however, in some embodiments, the term "environment information" may also refer to the environment information representative of an environment that is presented on the display of the device (such an environment being within the line of sight of the device). For example, in such a situation, with reference to FIG. 4B, the image of the lighthouse 191' presented on the display 177 would be environment information and the corresponding lighthouse 190 would be the environment.

Additionally, similar to the glasses 150 of FIG. 4A, in some embodiments, the device 175 may be configured to cause presentation of images on the display 177 along with the environment information. In the depicted embodiment, the description "LIGHTHOUSE" 180 is being presented to the user on the display 177 to indicate that the user is looking at a representation of a lighthouse (e.g., through the display 177, which is gathering the information from the camera). Though words are shown as being presented on the display, embodiments of the present invention contemplate presenting other types of images on the display (e.g., pictures, videos, notifications, visual attractants, etc.). Additionally, though the words shown in FIG. 4B are not transparent, embodiments of the present invention contemplate presentation of at least partially transparent images on the display.

As noted above, sonar images and radar images may be presented on displays. Some displays, however, are fixed to the water craft. As such, a user may be forced to look back and forth between the environment of interest (e.g., off the side of the water craft) and the display. This may be frustrating or difficult for a user. Further, the user's current activity may make it desirable for the user to not look away from the environment (e.g., the user is fishing, the user is driving the water craft, etc.).

As such, some embodiments of the present invention seek to provide for presentation of sonar and/or radar image data on a display over environment information. Indeed, as a user is looking at an environment (e.g., through a pass-through display (shown in FIG. 4A) or a display that is presenting information indicative of an environment (shown in FIG. 4B)), the sonar images and/or radar images could be presented over that environment information. For example, the user could be wearing a device with a head-mounted display that allows viewing of an environment (e.g., the water off the side of the boat) and the sonar image data for that spot in the water could be presented over the water to allow the user to see the underwater environment. Such a device may be useful for tracking fish while fishing or helping navigate a water craft around rocks. Indeed, a user would not need to take their eyes off the water, but would still receive relevant sonar data. Likewise, radar image data could be presented that enables a user to see relevant radar images while still viewing the environment. In some embodiments, such an invention may be referred to as "Mariner Vision."

Along these lines, some embodiments of the present invention contemplate a dynamic device that may be simply pointed in a direction by a user to receive sonar images and/or radar images associated with the environment in that direction. Moreover, the sonar images and/or radar images may be presented over the environment information in a form that allows the environment to still be viewed (e.g., the images are partially transparent).

In some embodiments, the apparatus 102, such as through the sensor 118, heading sensor 119, and/or processor 110, may be configured to determine a position and a line of sight of a device (e.g., such as may embody the apparatus 102). For example, the device may have a position and a line of sight that helps define what the device (and the user wearing or interacting with the device) is looking at (e.g., the environment). The position, in some cases, may be determined by the current position of the device, such as with GPS or similar location sensing technology. The line of sight, in some embodiments, may be determined by the orientation or heading of the device, such as with a sensor or heading sensor. For example, with reference to FIG. 5, a user (not shown) may be in a water craft 210 and using a device 200. The device 200 may have a position and a line of sight (as represented by volume 220). The position and line of sight may define the volume 220 of the environment 280 the device 200 is currently viewing.

Figure 5:
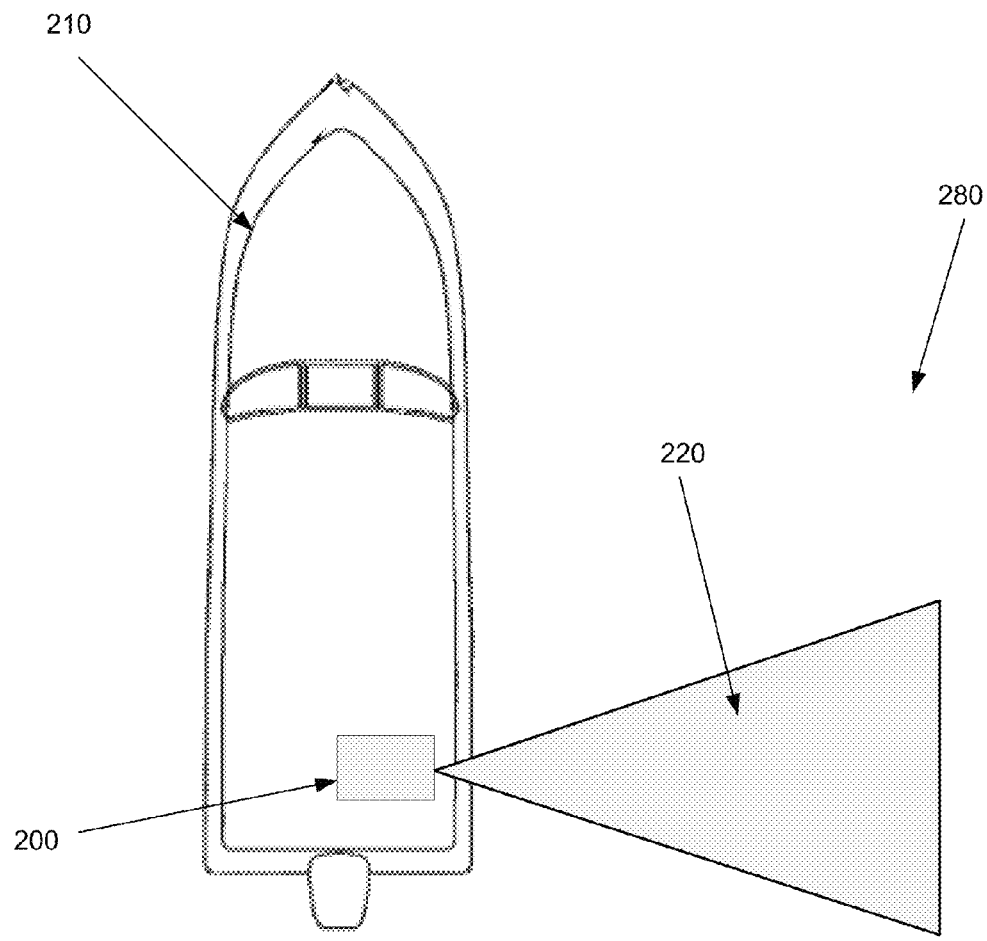
FIG. 5 illustrates a top view of a water craft and an example device, such as may embody the apparatus shown in FIG. 3, wherein the line of sight of the device is illustrated, in accordance with example embodiments described herein.
Figure 5A:
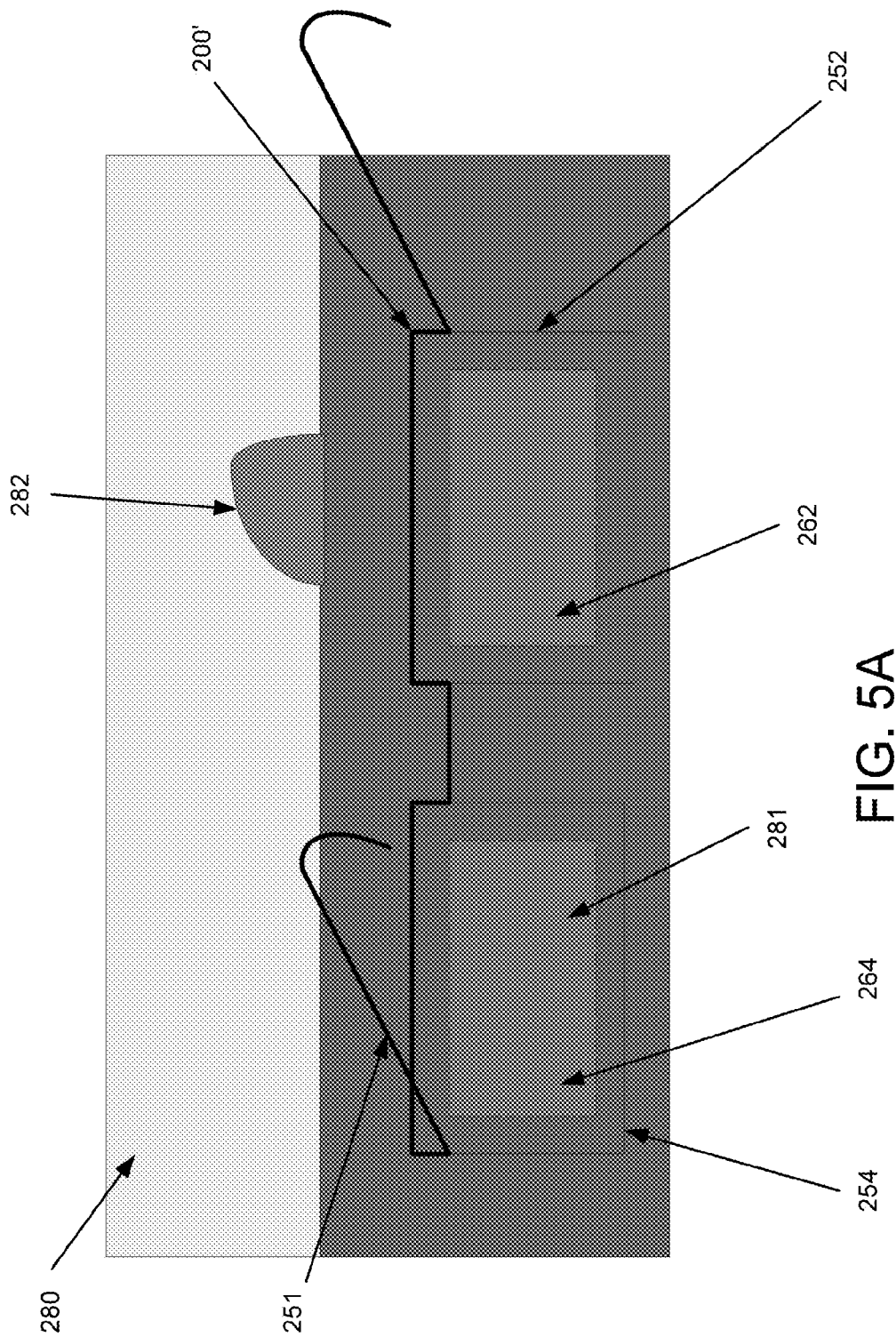
FIG. 5A illustrates the example device shown in FIG. 4A, wherein the line of sight of device is directed toward the water, in accordance with example embodiments described herein.

FIG. 5A illustrates an example device 200' (e.g., the glasses 150 shown in FIG. 4A) that includes a left lens 254 and a right lens 252. The left lens 254 and right lens 252 may be configured to interact with a user's left and right eye respectively. Additionally, the device 200' may include a frame 251 that is configured to engage with a user's head (e.g., ears) to mount to the user's head. Based on the line of sight and position, the device 200' may be viewing a volume 220 (shown in FIG. 5) of an environment 280. Indeed, while the environment 280 may include a full body of water and a large rock 282, the device 200' (and user) may only be viewing a certain portion (e.g., the water 281 off the side of the boat). In such a regard, the water 281 may be visible through the left lens 254 and right lens 264 of the device 200'. However, as noted above, the device 200' may also include a display, such as a left lens display 264 and a right lens display 262.

Figure 5B:
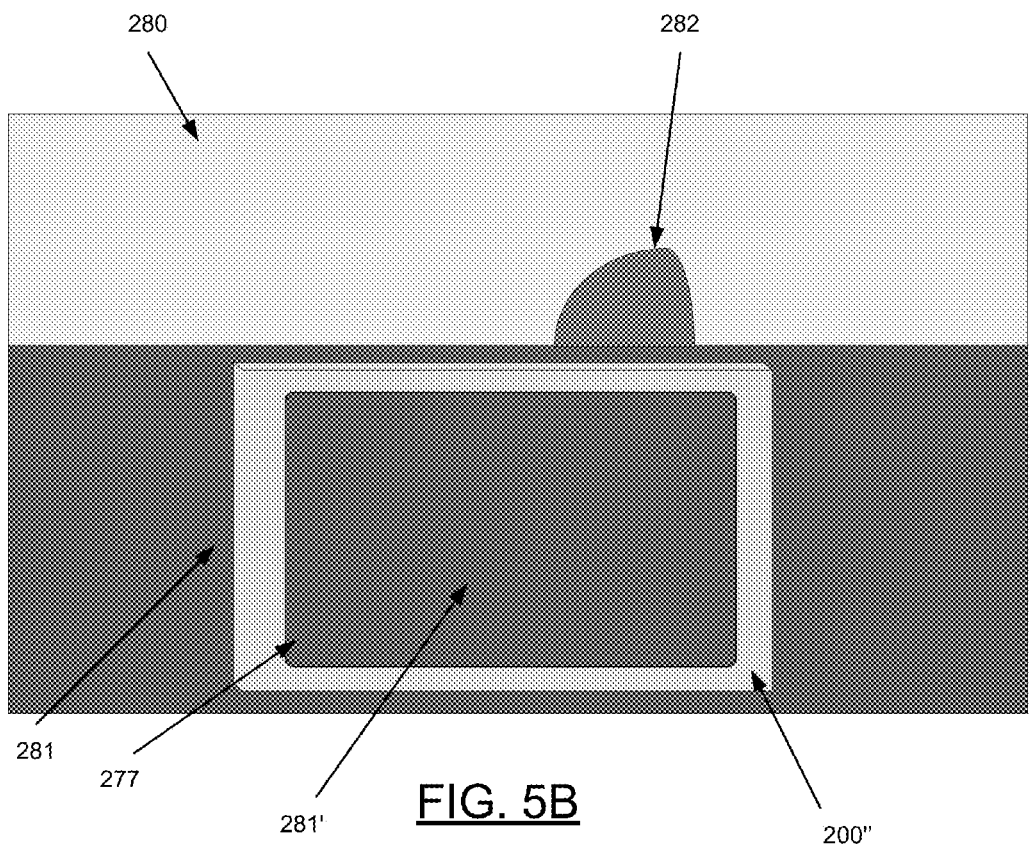
FIG. 5B illustrates the example device shown in FIG. 4B, wherein the line of sight of device is directed toward the water, in accordance with example embodiments described herein.

FIG. 5B illustrates another example device 200" (e.g., the device 175 shown in FIG. 4A) that includes a display 277. Based on the line of sight and position, the device 200" may be viewing a portion 220 (shown in FIG. 5) of an environment 280. Indeed, while the environment 280 may include a full body of water and a large rock 282, the device 200" (and user) may only be viewing a certain portion (e.g., the water 281 off the side of the boat). In such a regard, through use of some features of the device 200", such as a camera (not shown), environment information 281' indicative of the portion 281 of the environment 280 may be presented on the display 277. Such environment information 281' may be representative of real-time occurrences in the portion of the water 281 of the environment 280 being viewed.

In some embodiments, the apparatus 102, such as through the processor 110 and/or communication interface 114, may be configured to determine at least one of sonar image data or radar image data associated with the position and the line of sight of the device. For example, the sonar image data or radar image data associated with the position and the line of sight may be the sonar image data or radar image data that corresponds to the volume of space encompassed and defined by the position and line of sight of the device. Said differently, the associated sonar image data or radar image data may be that image data that the user of the device would see in their current line of sight if they were able to view such images.

In such a regard, in some embodiments, all available sonar image data and/or radar image data may need to be filtered to determine the sonar/radar image data associated with the position and line of sight. Indeed, a corresponding sonar system, as noted above, may capture sonar returns and process the sonar returns to form sonar image data. Such sonar image data, depending on the beam pattern, position, and heading of the transducer element, may be representative of a volume of the underwater environment that is greater than the volume associated with the position and line of sight of the device. Likewise, a radar module may capture radar returns and process the radar returns to form radar image data. Further, like the sonar image data, such radar image data may be representative of a volume of the environment that is greater than the volume associated with the position and line of sight of the device.

As such, in some embodiments, filtering of the sonar image data and/or radar image data may be needed in order to determine the sonar image data and/or radar image data associated with the position and line of sight of the device. In some embodiments, the filtering may occur in the apparatus 102, such as through a processor 110. For example, in some embodiments, the apparatus 102, such as through the communication interface 114, may be configured to receive at least one of unfiltered sonar image data or unfiltered radar image data. The unfiltered sonar image data may be indicative of sonar return data from at least one sonar transducer. The unfiltered radar image data may be indicative of radar return data from a radar. Then, the apparatus 102, such as through the processor 110, may be configured to determine the at least one of sonar image data or radar image data associated with the position and the line of sight from among the at least one of unfiltered sonar image data or unfiltered radar image data.

Additionally or alternatively, the filtering may occur external to the apparatus 102, such as in the sonar signal processor 32 shown in FIG. 2 (though any processor external to the apparatus 102 may perform the filtering, such as within the network 40). Then, the filtered sonar image data and/or radar image data may be provided to the apparatus 102. For example, in some embodiments, the apparatus 102, such as through the communication interface 114, may be configured to transmit the position and the line of sight of the device to the sonar signal processor 32 of the sonar module 44 (FIG. 2). Then, the sonar signal processor 32 may be configured to determine the at least one of sonar image data or radar image data associated with the position and the line of sight from among the at least one of unfiltered sonar image data or unfiltered radar image data. After that, the sonar signal processor 32 may be configured to provide the at least one of sonar image data or radar image data associated with the position and the line of sight to the apparatus 102. In such a manner, the apparatus 102, such as through the communication interface 114, may be configured to receive the at least one of sonar image data or radar image data associated with the position and the line of sight from the sonar signal processor.

Figure 6:
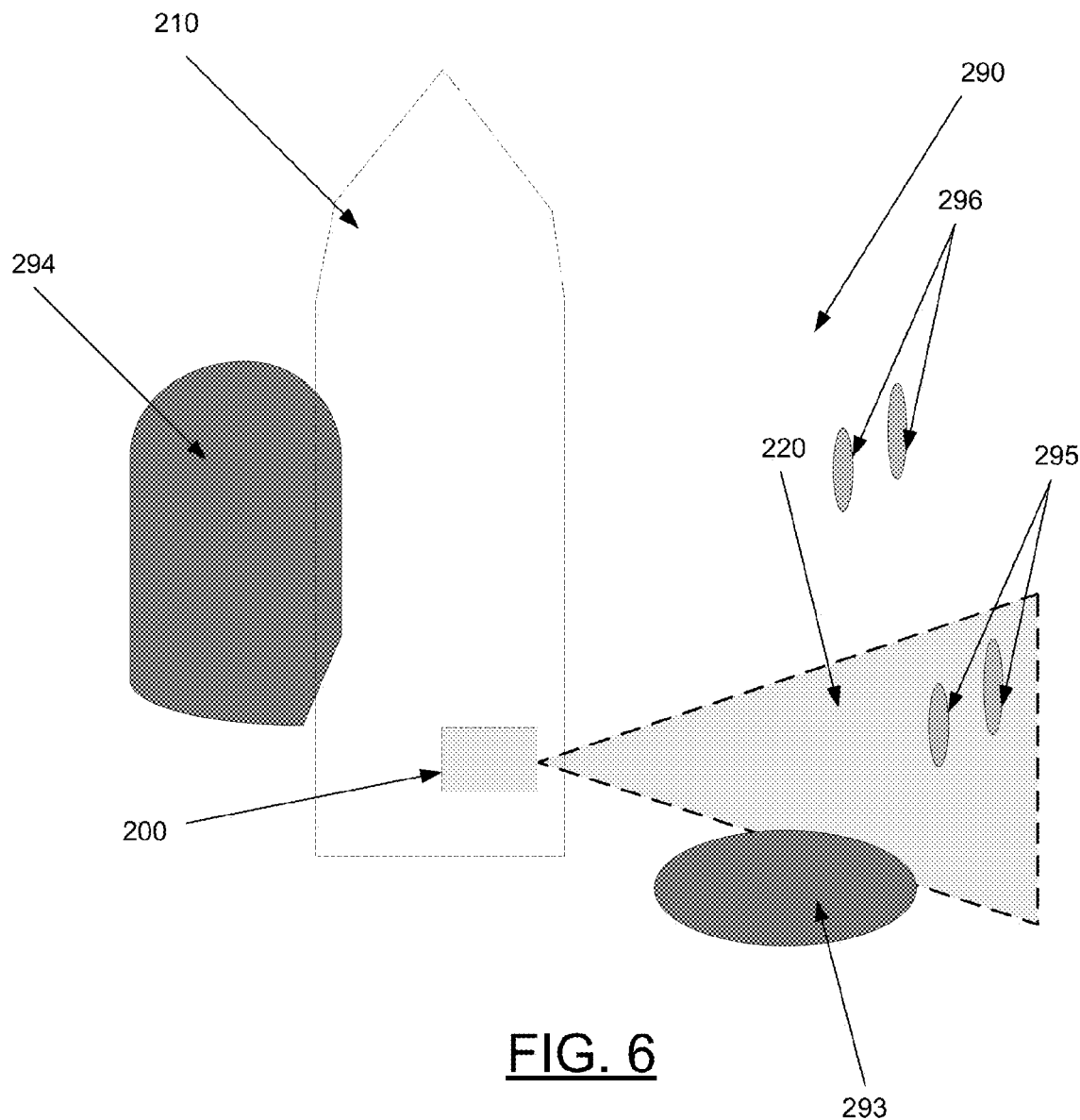
FIG. 6 illustrates a representation of an underwater environment under the water craft and device shown in FIG. 5, in accordance with example embodiments described herein.

With respect to sonar image data, FIG. 6 illustrates a representation of an underwater environment under the water craft 210 and device 200 shown in FIG. 5. The underwater environment 290 includes rocks 293, 294 and fish 295, 296. As such, the unfiltered sonar image data corresponding to the underwater environment 290 may include the rocks 293, 294 and the fish 295, 296. Notably, however, only a portion of the rock 293 and the fish 295 are associated with the position and line of sight of the device 200 (as represented by volume 220). Thus, it may be determined (e.g., by the device 200, sonar module (not shown), other device, etc.) that the sonar image data of the fish 295 and the portion of the rock 293 are associated with the position and the line of sight of the device 200.

Figure 7:
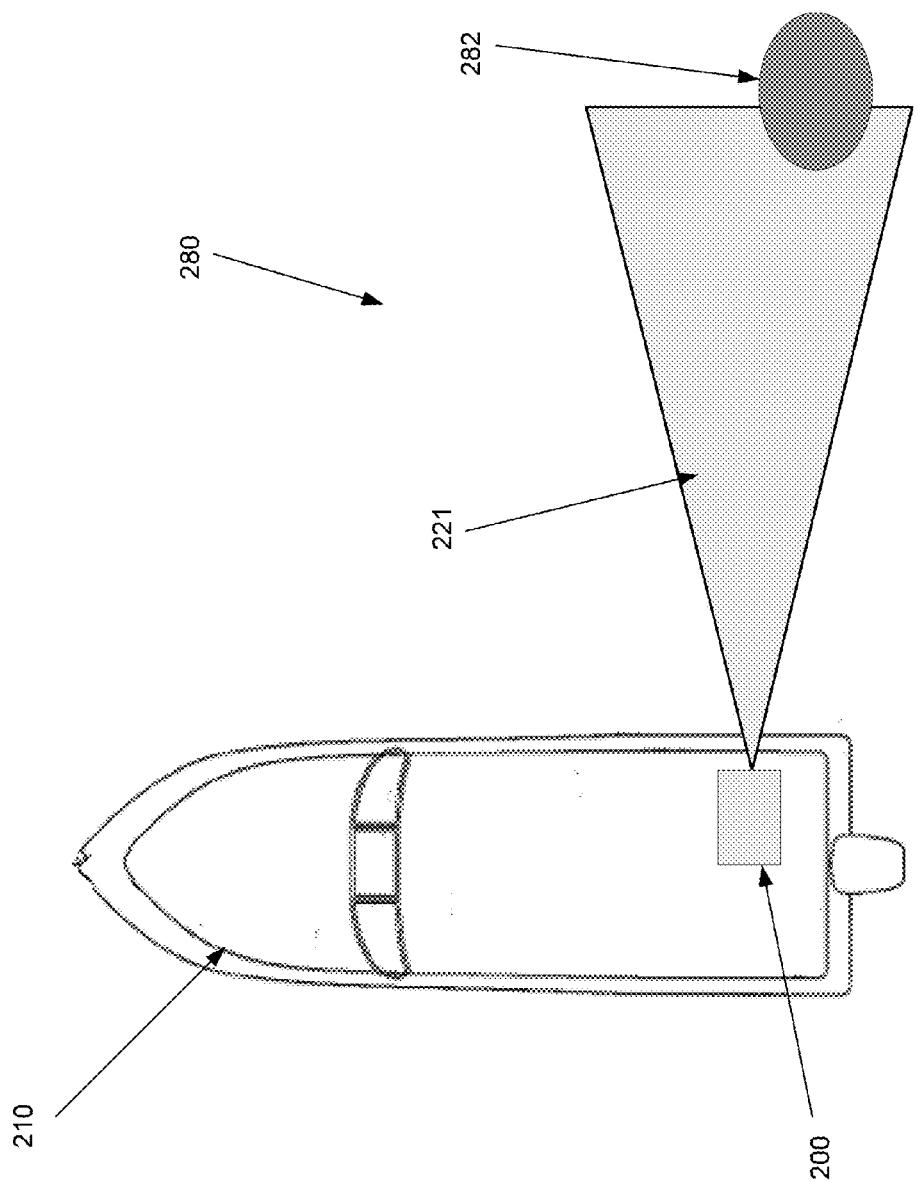
FIG. 7 illustrates a top view of the water craft and device shown in FIG. 5, wherein the device defines another line of sight, in accordance with example embodiments described herein.

With respect to radar image data, FIG. 7 illustrates a representation of an environment surrounding the water craft 210 and device 200 shown in FIG. 5. The environment 280 includes a large rock 282. The position and the line of sight of the device 200 defines a volume 221 that includes the large rock 282. In such a situation, it may be determined (e.g., by the device 200, sonar module (not shown), other device, etc.) that the radar image data of the large rock 282 is associated with the position and the line of sight of the device 200.

In some embodiments, the sonar image data or radar image data associated with the position and the line of sight of the device may be real-time image data. Said differently, in some embodiments, the at least one sonar image data or radar image data associated with the position and the line of sight of the device may be indicative of sonar return data or radar return data currently being captured. For example, with respect to sonar image data and with reference to FIG. 6, the sonar image data of the fish 295 and the portion of the rock 293 may be what is currently within the line of sight of the device 200 (e.g., in real-time). As such, should the fish 295 move out of the line of sight (e.g., volume 220) of the device 200, the sonar image data associated with the position and line of sight of the device 200 would be updated to remove the sonar image data of the fish 295. Along these lines, with respect to radar image data and with reference to FIG. 7, the watercraft 210 could move and the rock 282 may no longer be within the line of sight of the device 200.

In some embodiments, the apparatus 102, such as through the user interface 116 and/or processor 110, may be configured to cause presentation of an image associated with the at least one of sonar image data or radar image data on a display of the device. In some embodiments, the apparatus 102 may be configured to cause presentation of the image over environment information indicative of an environment currently viewable by a user through the device. Along these lines, in some embodiments, the apparatus 102, such as through the user interface 114 and/or processor 110, may be configured to cause presentation of the image over the environment information to be at least partially transparent. In such a manner, the user may view the environment information through the image of the sonar image data or radar image data associated with the position and line of sight of the device. Such an embodiment enables the user of the device to view both the sonar/radar images and the environment through the device.

Figure 6A:
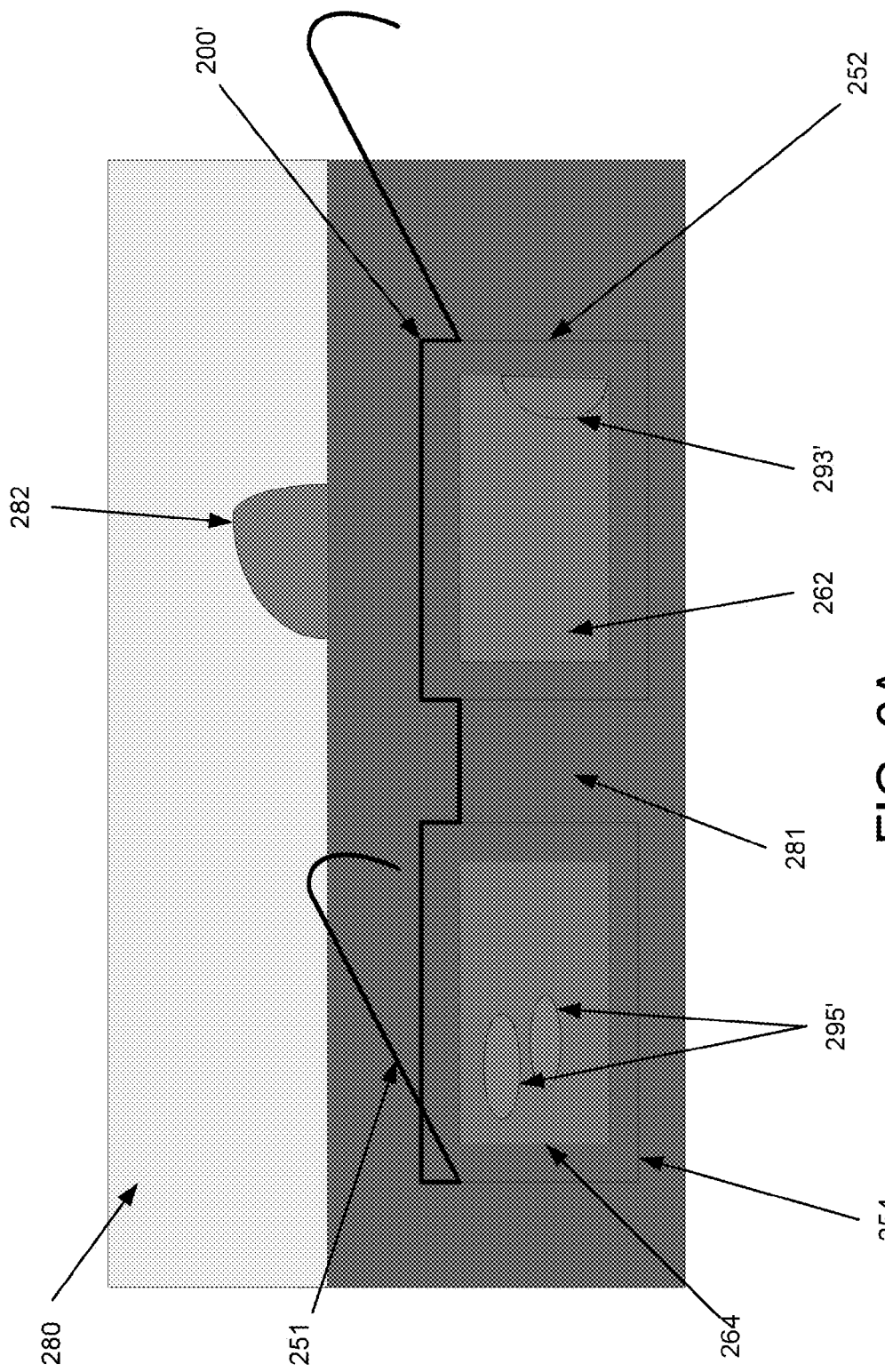
FIG. 6A illustrates the example device shown in FIG. 5A, wherein sonar images from within the line of sight of device are being presented on the display over the water, in accordance with example embodiments described herein.

With respect to sonar image data, FIG. 6A illustrates the device 200' shown in FIG. 5A. The position and line of sight of the device 200' remains the same such that the water 281 is visible through the left lens 254 and right lens 264. However, as noted above, the device 200' determined sonar image data associated with the position and the line of sight to be fish 295 and a portion of the rock 293. As such, the device 200' caused presentation of a representation of the fish 295' and the portion of the rock 293' on the left lens display 264 and the right lens display 262. Additionally, the position of the fish 295' and the portion of the rock 293' correspond to their position in the underwater environment 290 (shown in FIG. 6). As noted above and shown in FIG. 6A, the fish 295' and the portion of the rock 293' are at least partially transparent such that the user of the device 200' may still view the environment information through the device 200'.

Though the depicted embodiment of FIG. 6A details presentation of the fish 295' on the left lens display 264 and presentation of the portion of the rock 293' on the right lens display 262, some embodiments of the present invention contemplate presentation of the sonar image data on both the left lens display 264 and the right lens display 262. Indeed, the sonar image data may be presented on the corresponding lens displays based on the perspective of the user (e.g., the wearer of the device 200'). For example, the fish 295' could be presented on generally the left side of each of the left lens display 264 and the right lens display 262 such that a user wearing the device 200' would see the fish 295' through each lens 254, 252 respectively.

Figure 6B:
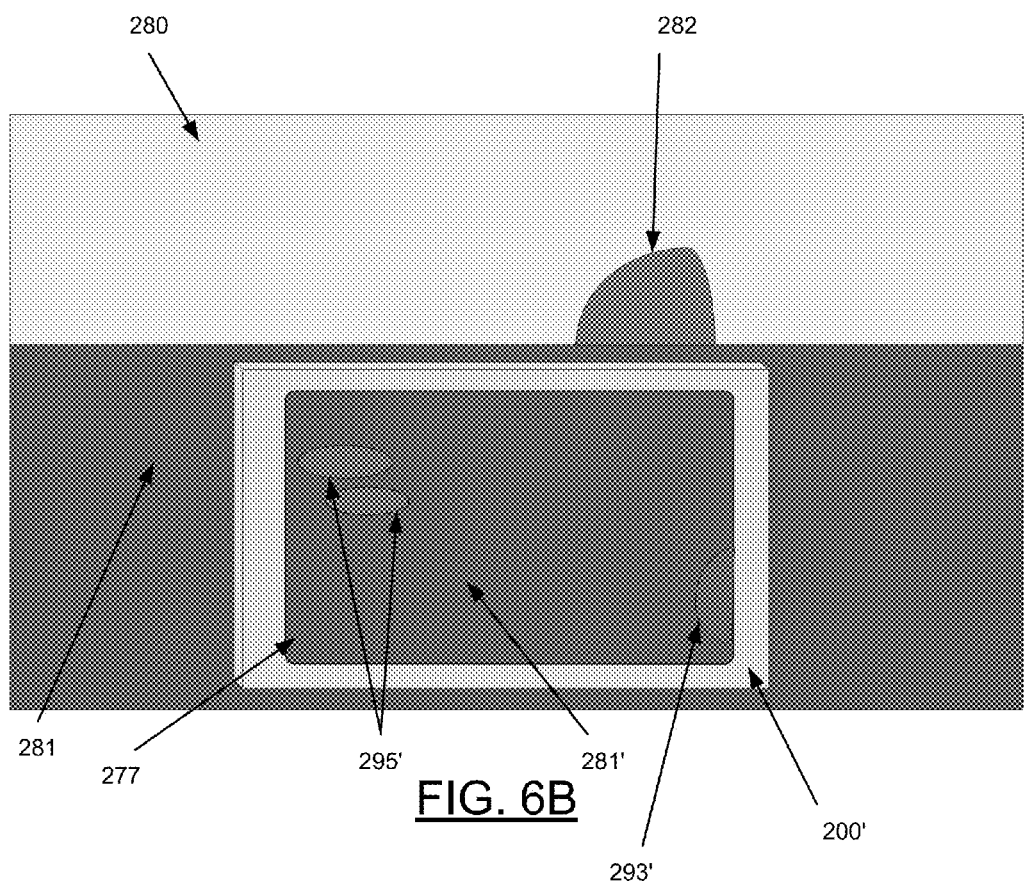
FIG. 6B illustrates the example device shown in FIG. 5B, wherein sonar images from within the line of sight of device are being presented on the display over the image of the water, in accordance with example embodiments described herein.

With respect to sonar image data, FIG. 6B illustrates the device 200" shown in FIG. 5B. The position and line of sight of the device 200' remains the same such that the environment information 281' indicative of the water 281 is presented on the display 277. However, as noted above, the device 200" determined sonar image data associated with the position and the line of sight to be fish 295 and a portion of the rock 293. As such, the device 200" caused presentation of a representation of the fish 295' and the portion of the rock 293' on the display 277. Additionally, the position of the fish 295' and the portion of the rock 293' correspond to their position in the underwater environment 290 (shown in FIG. 6). As noted above and shown in FIG. 6B, the fish 295' and the portion of the rock 293' are at least partially transparent such that the user of the device 200" may still view the environment information through the device 200".

With respect to radar image data, FIG. 7A illustrates the device 200' with a line of sight and position that includes the fog 286. In such a situation, the user of the device 200' may see the fog 286. However, as noted above, the device 200' may determine radar image data associated with the position and the line of sight to be a large rock 282 (shown in FIG. 7). As such, with reference to FIG. 7B, the device 200' may cause presentation of a representation of the large rock 282' on the right lens display 262. Additionally, the position of the large rock 282' on the right lens display 262 corresponds to the position of the large rock 282 in the environment 280 (shown in FIG. 7). As noted above and shown in FIG. 7B, the large rock 282' is at least partially transparent such that the user of the device 200' may still view the environment information through the device 200'.

In some embodiments, the user may provide input to the device to initiate or cease presentation of the sonar image data or radar image data associated with the position and line of sight of the device. In such a manner, the user can turn the feature on or off. Along these lines, in some embodiments, the apparatus 102, such as through the user interface 116, processor 110, sensor 118, and/or UI control circuitry 122, may be configured to receive user input indicating a desire to cause presentation of the image associated with the at least one of sonar image data or radar image data associated with the position and line of sight. Additionally or alternatively, in some embodiments, the apparatus 102, such as through the user interface 116, processor 110, sensor 118, and/or UI control circuitry 122, may be configured to receive user input indicating a desire to cease presentation of the image and, in response, cause presentation of the image to cease. In such a way, a user may easily switch in between modes of viewing and not viewing the additional sonar/radar images, which may provide an important safety feature.

In some embodiments, any type of user input may be used to control activation or deactivation of the presentation of the sonar/radar image data. For example, a user may tap on the device to turn presentation of the sonar/radar images on or off. Alternatively, in some embodiments, a designated movement of the user (and/or device) may perform the same function. For example, in some embodiments, a quick turn of the user's head (and, in some cases, the device being worn by the user) may cause the apparatus 102 to cease presentation of the sonar image data and/or radar image data. Such an embodiment may be useful during navigation of the water craft.

Along these lines, user input may be useful for controlling other possible functions of the apparatus 102, such as controlling the degree of transparency at which the sonar images and/or radar images are presented. Indeed, in some embodiments, the apparatus 102, such as through the user interface 116, processor 110, sensor 118, and/or UI control circuitry 122, may be configured to receive user input indicating a desire to adjust a level of transparency of the image and, in response, cause adjustment of the level of transparency of the image based on the user input. In some embodiments, any type of user input may be used to control the level of transparency (e.g., run a finger along a surface of the device, provide input to a scroll bar presented on the display of the device, the number of taps on the side of the device, etc.). Along these lines, in some embodiments, a designated movement of the user (and device) may control the level of transparency of the image. For example, in some embodiments the apparatus 102, such as through the sensor 118 and/or processor 110, may be configured to detect movement of the user's head (and, in some cases, the device) and, in response, cause adjustment of the level of transparency based on the degree of movement of the user's head. As such, a quick movement of the user's head may increase the transparency so as to allow the user to fully view the environment without the sonar/radar image as a distraction.

In some embodiments, the sonar image and/or radar image associated with the position and line of sight of the device may be updated as the line of sight and/or position of the device changes. Indeed, in some embodiments, the apparatus 102, such as through the processor 110, sensor 118, heading sensor 119, and/or user interface 116, may be configured to detect movement of the device such that the device defines a second position and/or second line of sight. Thus, the volume at which the sonar image data and/or radar image data would be associated would change. Further, the apparatus 102, such as through the processor 110, sensor 118, heading sensor 119, and/or user interface 116, may be configured to determine the second position and the second line of sight of the device. Further, the apparatus 102, such as through the processor 110, and/or communication interface 114, may be configured to determine the second sonar image data and/or radar image data associated with the second position and the second line of sight of the device. Finally, the apparatus 102, such as through the processor 110, and/or user interface 116, may be configured to cause presentation of the image to be updated based on the second sonar image data and/or second radar image data.

Figure 8:
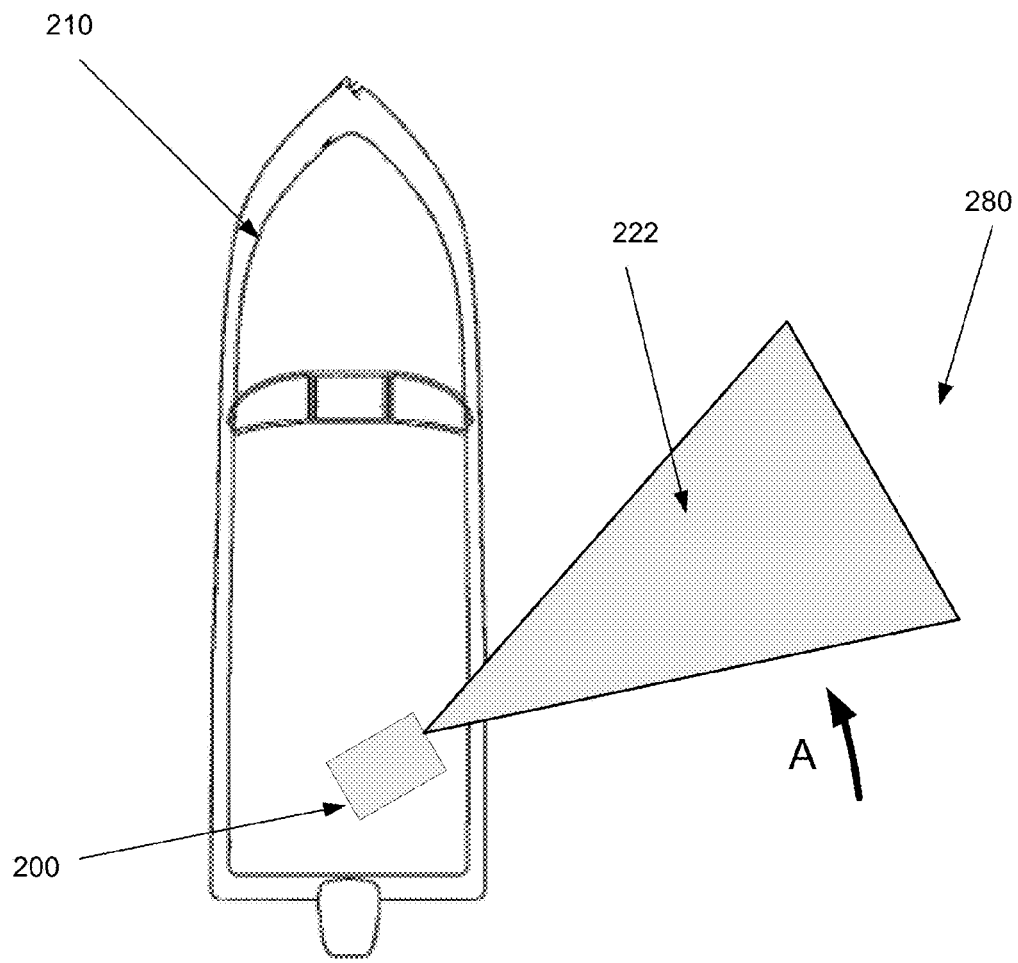
FIG. 8 illustrates a top view of the water craft and device shown in FIG. 5, wherein the line of sight of the device has been rotated along arrow A, in accordance with example embodiments described herein.
Figure 8A:
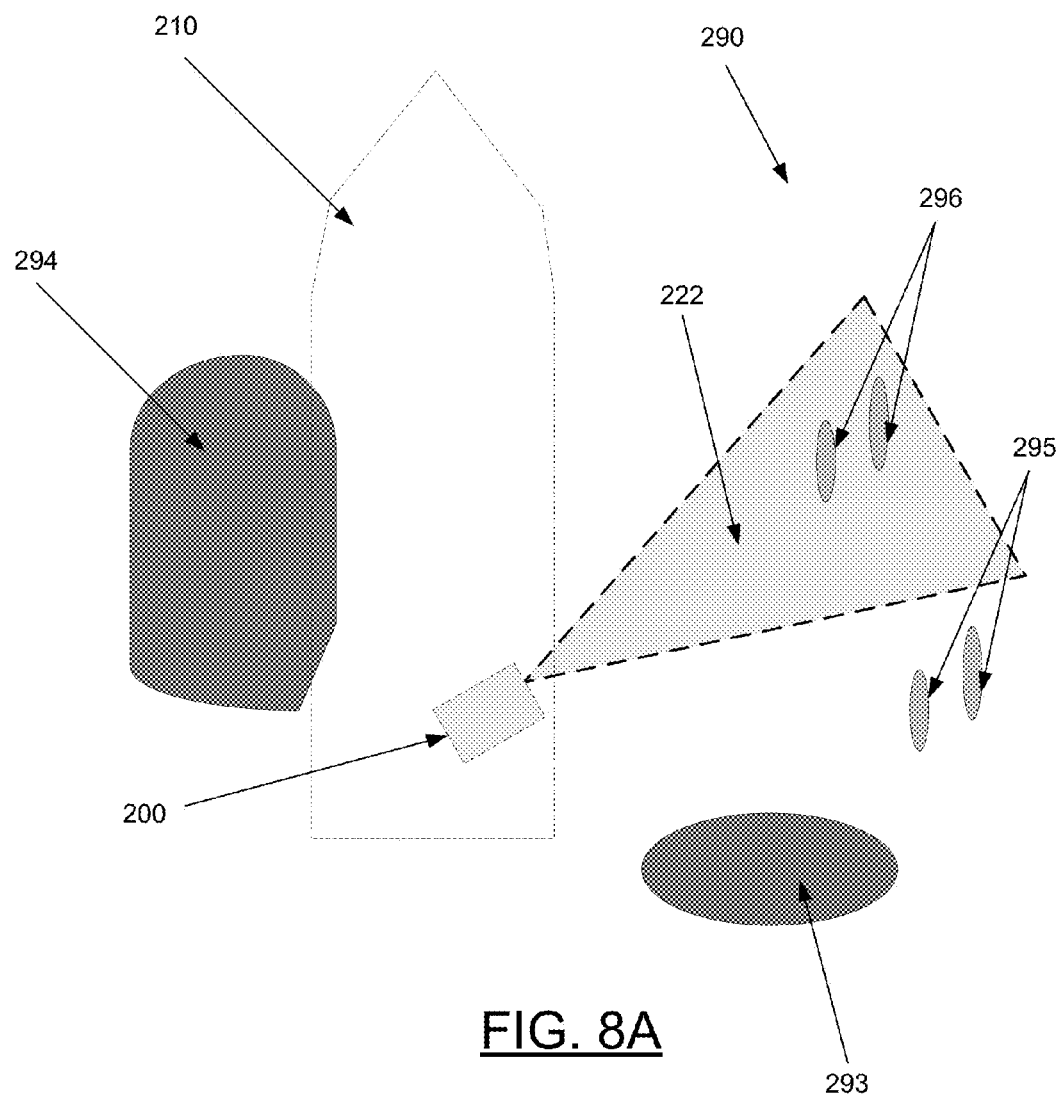
FIG. 8A illustrates a representation of the underwater environment under the water craft and device shown in FIG. 8, in accordance with example embodiments described herein.
Figure 8B:
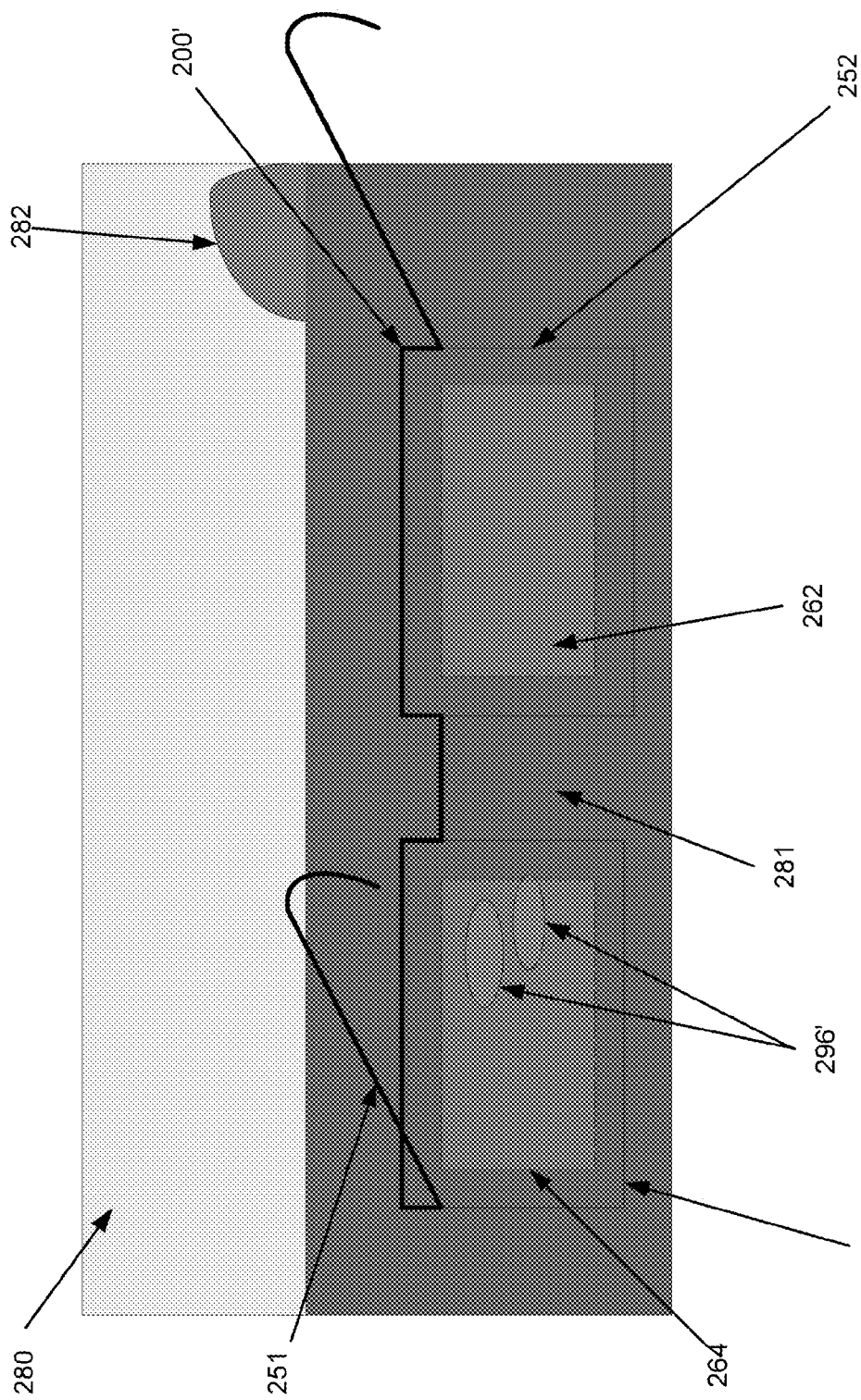
FIG. 8B illustrates the example device shown in FIG. 4A, wherein sonar images from within the updated line of sight of device are being presented on the display over the water, in accordance with example embodiments described herein.

For example, with reference to FIG. 8, the device 200 on the water craft 210 may change its line of sight and/or position. In the depicted embodiment, the device 200 rotates to the left (e.g., along arrow A) such that the new position and new line of sight defines a new volume 222. Likewise, with reference to FIG. 8A, the fish 296 are now within the volume 222 (as opposed to the fish 295 and the portion of the rock 293, as shown in FIG. 6). With reference to FIG. 8B, the device 200' now defines the new line of sight (e.g., the large rock 282 has moved to the right in the environment 280). As such, the device 200' has updated the image on the left lens display 264 to present images 296' of the fish 296 (as opposed to images of the fish 295' and portion of the rock 293', as shown in FIG. 6A).

Figure 8C:
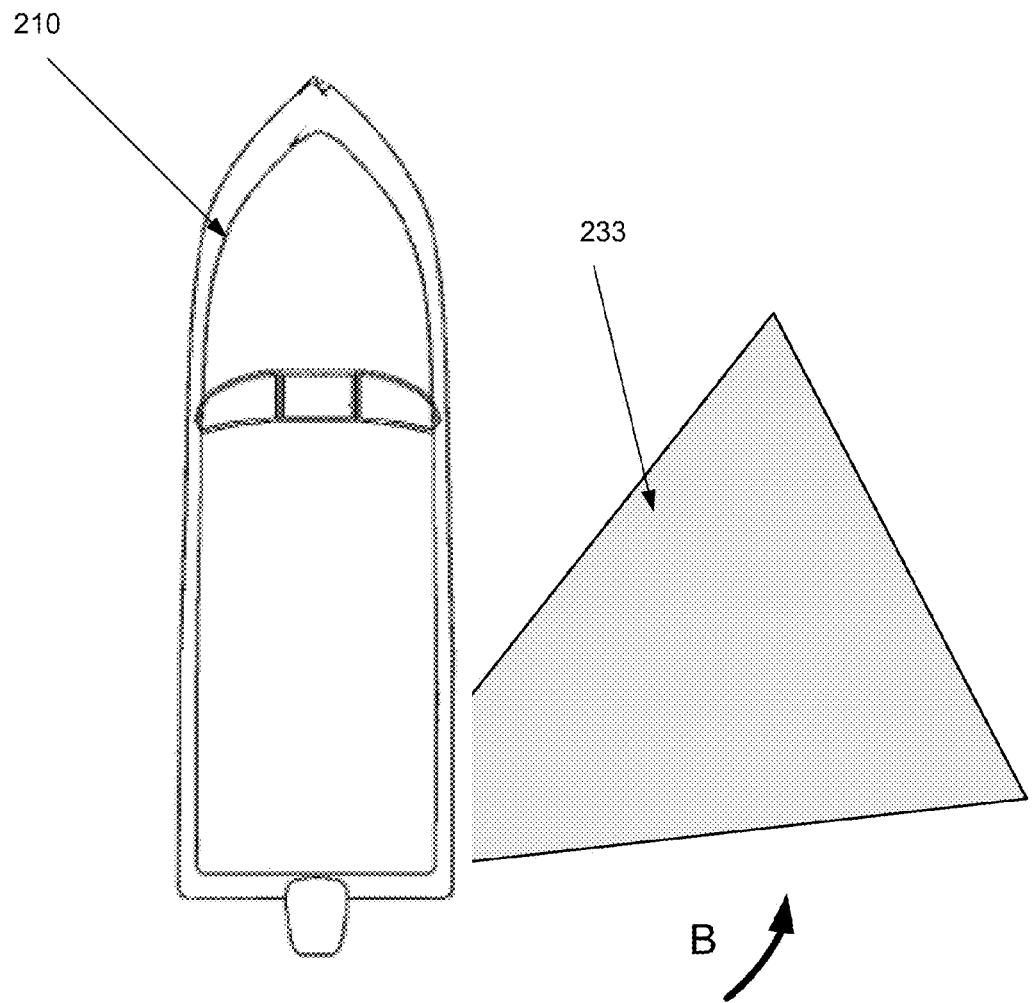
FIG. 8C illustrates a top view of the water craft shown in FIG. 8, wherein the beam pattern of a sonar transducer assembly of the water craft has been rotated along arrow B with the line of sight of the device shown in FIG. 8, in accordance with example embodiments described herein.

Some embodiments of the present invention also contemplate controlling or steering the transducer elements to follow the position and line of sight of the device. Such a feature will provide extremely accurate and up-to-date sonar image information to the device as it moves. Indeed, in some embodiments, the apparatus 102, such as through the processor 110 and/or communication interface 116, may be configured to transmit instructions to a sonar system to cause a sonar transducer to aim in a direction associated with the position and the line of sight of the device. For example, with reference to FIG. 8A, as the position and the line of sight of the device 200 changes to define volume 222 (e.g., along arrow A), the device 200 may send instructions to the sonar system of the water craft 210 to cause steering of the sonar transducer. In such a manner, with reference to FIG. 8C, the transducer element may rotate (e.g., along arrow B) such that the beam pattern for transmitting sonar pulses and/or capturing sonar returns may rotate to define a volume 233 that corresponds to the line of sight (e.g., volume 222) of the device 200. Such an embodiment provides a dynamic system that can provide targeted and instant sonar image information to the device.

In some embodiments, additional useful information may also be presented on the display of the apparatus 102. In such a regard, in some embodiments, the apparatus 102, such as through the processor 110 and/or communication interface 116, may be configured to cause presentation of additional information on the display concurrent with causing presentation of the image on the display. Such additional information may include navigational information, marine information, weather information, or any other kind of information. Some examples of such information are engine information, network information, depth readings, headings, temperature readings, navigation aids, depth contours, danger zones, shallow water dangers, water temperatures, web browsers, etc.

Embodiments of the present invention provide methods, apparatus and computer program products for causing presentation of sonar or radar image data over environment information. Various examples of the operations performed in accordance with embodiments of the present invention will now be provided with reference to FIGS. 9-11.

Figure 9:
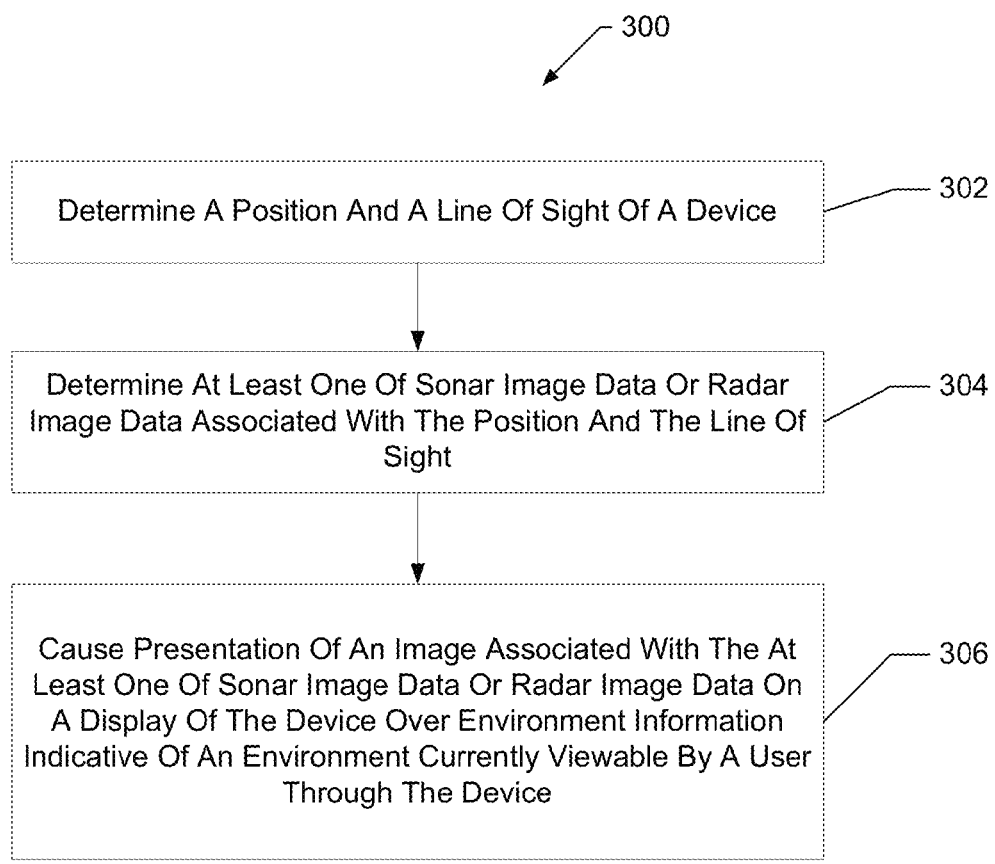
FIG. 9 illustrates a flowchart according to an example method for causing presentation of sonar or radar image data over environment information, in accordance with an example embodiment described herein.

FIG. 9 illustrates a flowchart according to an example method for causing presentation of sonar or radar image data over environment information according to an example embodiment 300. The operations illustrated in and described with respect to FIG. 9 may, for example, be performed by, with the assistance of, and/or under the control of one or more of the processor 110, memory 112, communication interface 114, user interface 116, sensor 118, heading sensor 119, or UI control circuitry 122. Operation 302 may comprise determining a position and a line of sight of a device. The processor 110, communication interface 114, sensor 118, and/or heading sensor 119 may, for example, provide means for performing operation 302. Operation 304 may comprise determining at least one sonar image data or radar image data associated with the position and the line of sight of the device. The processor 110 and/or communication interface 114 may, for example, provide means for performing operation 304. Operation 306 may comprise causing presentation of an image associated with the at least one of sonar image data or radar image data on a display of the device over environment information indicative of an environment currently viewable by a user through the device. The processor 110, user interface 116, and/or UI control circuitry 122 may, for example, provide means for performing operation 306.

FIG. 10 illustrates a flowchart according to another example method for causing presentation of sonar or radar image data over environment information according to an example embodiment 400. The operations illustrated in and described with respect to FIG. 10 may, for example, be performed by, with the assistance of, and/or under the control of one or more of the processor 110, memory 112, communication interface 114, user interface 116, sensor 118, heading sensor 119, or UI control circuitry 122. Operation 402 may comprise determining a position and a line of sight of a device. The processor 110, communication interface 114, sensor 118, and/or heading sensor 119 may, for example, provide means for performing operation 402. Operation 403 may comprise transmitting the position and the line of sight of the device to a sonar signal processor. The processor 110 and/or communication interface 114 may, for example, provide means for performing operation 403. Operation 405 may comprise receiving at least one sonar image data or radar image data associated with the position and the line of sight of the device from the sonar signal processor. The processor 110 and/or communication interface 114 may, for example, provide means for performing operation 405. Operation 406 may comprise causing presentation of an image associated with the at least one of sonar image data or radar image data on a display of the device over environment information indicative of an environment currently viewable by a user through the device. The processor 110, user interface 116, and/or UI control circuitry 122 may, for example, provide means for performing operation 406.

FIG. 11 illustrates a flowchart according to yet another example method for causing presentation of sonar or radar image data over environment information according to an example embodiment 500. The operations illustrated in and described with respect to FIG. 11 may, for example, be performed by, with the assistance of, and/or under the control of one or more of the processor 110, memory 112, communication interface 114, user interface 116, sensor 118, heading sensor 119, or UI control circuitry 122. Operation 502 may comprise determining a position and a line of sight of a device. The processor 110, communication interface 114, sensor 118, and/or heading sensor 119 may, for example, provide means for performing operation 502. Operation 503 may comprise receiving at least one of unfiltered sonar image data or unfiltered radar image data. The unfiltered sonar image data is indicative of sonar return data from at least one sonar transducer. The unfiltered radar image data is indicative of radar return data from a radar. The processor 110 and/or communication interface 114 may, for example, provide means for performing operation 503. Operation 505 may comprise determining the at least one of sonar image data or radar image data associated with the position and the line of sight from among the at least one of unfiltered sonar image data or unfiltered radar image data. The processor 110 may, for example, provide means for performing operation 505. Operation 506 may comprise causing presentation of an image associated with the at least one of sonar image data or radar image data on a display of the device over environment information indicative of an environment currently viewable by a user through the device. The processor 110, user interface 116, and/or UI control circuitry 122 may, for example, provide means for performing operation 506.

FIGS. 9-11 each illustrate a flowchart of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a server or other computing device (for example, in the memory 112) and executed by a processor in the computing device (for example, by the processor 110). In some embodiments, the computer program instructions comprising the computer program product(s) which embody the procedures described above may be stored by memory devices of a plurality of computing devices. As will be appreciated, any such computer program product may be loaded onto a computer or other programmable apparatus (for example, an apparatus 102) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (for example, an apparatus 102) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. In one embodiment, a suitably configured processor (for example, the processor 110) may provide all or a portion of the elements. In another embodiment, all or a portion of the elements may be configured by and operate under control of a computer program product. The computer program product for performing the methods of an example embodiment of the invention includes a computer-readable storage medium (for example, the memory 112), such as the non-volatile storage medium, and computer-readable program code portions, such as a series of computer instructions, embodied in the computer-readable storage medium.

Many modifications and other embodiments of the inventions set forth herein will come to mind to one skilled in the art to which these embodiments pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method comprising:
   determining a position and a line of sight of a device;
   determining, by a processor, at least one of sonar image data or radar image data associated with the position and the line of sight; and
   causing presentation of a generated image associated with the at least one of sonar image data or radar image data on a display of the device over unaltered environment information indicative of an environment currently viewable by a user through the display of the device, wherein the generated image is presented over the environment information from the perspective of the user viewing the environment information.

2. The method according to claim 1, wherein the at least one sonar image data or radar image data associated with the position and the line of sight is indicative of sonar return data or radar return data currently being captured.

3. The method according to claim 1, wherein causing presentation of the image comprises causing presentation of the image over the environment information to be at least partially transparent.

4. The method according to claim 3 further comprising:
   receiving user input indicating a desire to adjust a level of transparency of the image; and
   in response, causing adjustment of the level of transparency of the image based on the user input.

5. The method according to claim 4, wherein receiving user input comprises detecting movement of the user's head, and wherein causing adjustment of the level of transparency of the image comprises causing adjustment of the level of transparency based on a degree of movement of the user's head.

6. The method according to claim 1 further comprising transmitting instructions to a sonar system to cause a sonar transducer to aim in a direction associated with the position and the line of sight of the device.

7. The method according to claim 1 further comprising:
detecting movement of the device such that the device defines a second position and a second line of sight;
determining the second position and the second line of sight of the device;
determining at least one of second sonar image data or second radar image data associated with the second position and the second line of sight; and
causing presentation of the image to be updated based on the at least one of second sonar image data or second radar image data.

8. The method according to claim 1 further comprising receiving user input indicating a desire to cause presentation of the image associated with the at least one of sonar image data or radar image data associated with the position and line of sight.

9. The method according to claim 1 further comprising:
receiving user input indicating a desire to cease presentation of the image; and
in response, causing presentation of the image to cease.

10. The method according to claim 1, wherein determining the at least one of sonar image data or radar image data comprises:
transmitting the position and the line of sight to a sonar signal processor; and
receiving the at least one of sonar image data or radar image data associated with the position and the line of sight from the sonar signal processor.

11. The method according to claim 1, wherein determining the at least one of sonar image data or radar image data comprises:
receiving at least one of unfiltered sonar image data or unfiltered radar image data, wherein the unfiltered sonar image data is indicative of sonar return data from at least one sonar transducer, wherein the unfiltered radar image data is indicative of radar return data from a radar; and
determining the at least one of sonar image data or radar image data associated with the position and the line of sight from among the at least one of unfiltered sonar image data or unfiltered radar image data.

12. The method according to claim 1, wherein the device comprises at least one lens, wherein the user may view the environment through the at least one lens, and wherein causing presentation of the image on the display comprises causing presentation of the image on at least a portion of the at least one lens.

13. The method according to claim 1 further comprising causing presentation of the environment information on the display concurrent with causing presentation of the image on the display.

14. The method according to claim 1 further comprising causing presentation of additional information on the display concurrent with causing presentation of the image on the display, wherein the additional information includes at least one of navigational information, marine information, and weather information.

15. The method according to claim 1, wherein causing presentation of the generated image over the unaltered environment information creates a combined reality and virtual reality view for the user.

16. An apparatus comprising a processor and a memory including computer program code, the memory and the computer program code configured to, with the processor, cause the apparatus to:
determine a position and a line of sight of a device;
determine at least one of sonar image data or radar image data associated with the position and the line of sight; and
cause presentation of a generated image associated with the at least one of sonar image data or radar image data on a display of the device over unaltered environment information indicative of an environment currently viewable by a user through the display of the device, wherein the generated image is presented over the environment information from the perspective of the user viewing the environment information.

17. The apparatus of claim 16, wherein the at least one sonar image data or radar image data associated with the position and the line of sight is indicative of sonar return data or radar return data currently being captured.

18. The apparatus of claim 16, wherein the memory and the computer program code are further configured to, with the processor, cause the apparatus to cause presentation of the image by causing presentation of the image over the environment information to be at least partially transparent.

19. The apparatus according to claim 16, wherein the memory and the computer program code are further configured to, with the processor, cause the apparatus to cause presentation of the generated image over the unaltered environment information to create a combined reality and virtual reality view for the user.

20. Computer program product comprising a non-transitory computer readable medium having program code portions stored thereon, the program code portions being a computer readable medium and configured when said program product is run on a computer or network device, to:
determine a position and a line of sight of a device;
determine at least one of sonar image data or radar image data associated with the position and the line of sight; and
cause presentation of a generated image associated with the at least one of sonar image data or radar image data on a display of the device over unaltered environment information indicative of an environment currently viewable by a user through the display of the device, wherein the generated image is presented over the environment information from the perspective of the user viewing the environment information.

21. The computer program product of claim 20, wherein the at least one sonar image data or radar image data associated with the position and the line of sight is indicative of sonar return data or radar return data currently being captured.

22. The computer program product of claim 20, wherein the program code portions are further configured when said program product is run on a computer or network device, to cause presentation of the image by causing presentation of the image over the environment information to be at least partially transparent.

23. The computer program product of claim 20, wherein the program code portions are further configured when said program product is run on a computer or network device, to cause presentation of the generated image over the unaltered environment information to create a combined reality and virtual reality view for the user.

24. A sonar system for imaging an underwater environment, the sonar system comprising:

a sonar transducer assembly comprising at least one sonar transducer, wherein the sonar transducer is configured to receive sonar returns from sonar pulses within the underwater environment, wherein the sonar transducer is configured to convert sound energy of the sonar returns into sonar return data;

a sonar signal processor configured to receive and process the sonar return data to product sonar image data indicative of the underwater environment; and a remote device comprising a processor and a memory including computer program code, the memory and the computer program code configured to, with the processor, cause the device to:

determine a position and a line of sight of the device;

determine sonar image data associated with the position and the line of sight; and cause presentation of a generated image associated with the at least one of sonar image data or radar image data on a display of the device over unaltered environment information indicative of an environment currently viewable by a user through the display of the device, wherein the generated image is presented over the environment information from the perspective of the user viewing the environment information.

25. The sonar system according to claim 24, wherein the device is configured to transmit the position and the line of sight to the sonar signal processor, wherein the sonar signal processor is configured to determine the at least one sonar image data associated with the position and the line of sight and transmit the at least one of sonar image data or radar image data associated with the position and the line of sight to the device.

26. The sonar system according to claim 24, wherein the device is configured to receive the sonar image data from the sonar signal processor and determine or the sonar image data associated with the position and the line of sight therefrom.

27. The sonar system according to claim 24, wherein the sonar signal processor is configured to cause the sonar transducer to aim in a direction associated with the position and the line of sight of the device.

28. The sonar system according to claim 24, wherein the device is configured to cause presentation of the generated image over the unaltered environment information to create a combined reality and virtual reality view for the user.

* * * * *